United States Patent
Kato et al.

(10) Patent No.: US 7,718,315 B2
(45) Date of Patent: May 18, 2010

(54) ALKALINE BATTERY AND POSITIVE ELECTRODE MATERIAL FOR ALKALINE BATTERY COMPRISING NICKEL OXYHYDROXIDE AND MANGANESE DIOXIDE

(75) Inventors: Fumio Kato, Kadoma (JP); Katsuya Sawada, Hirakata (JP); Hidekatsu Izumi, Katano (JP); Yasuo Mukai, Moriguchi (JP); Shigeto Noya, Neyagawa (JP)

(73) Assignee: Panasonic Corporation, Osaka (JP)

( * ) Notice: Subject to any disclaimer, the term of this patent is extended or adjusted under 35 U.S.C. 154(b) by 1240 days.

(21) Appl. No.: 10/554,356

(22) PCT Filed: Nov. 4, 2004

(86) PCT No.: PCT/JP2004/016311
§ 371 (c)(1),
(2), (4) Date: Oct. 25, 2005

(87) PCT Pub. No.: WO2005/045958
PCT Pub. Date: May 19, 2005

(65) Prior Publication Data
US 2006/0257742 A1    Nov. 16, 2006

(30) Foreign Application Priority Data
Nov. 6, 2003 (JP) ............... 2003-376769
Mar. 2, 2004 (JP) ............... 2004-057222

(51) Int. Cl.
  *H01M 4/00* (2006.01)
  *H01M 4/62* (2006.01)
  *C01G 53/04* (2006.01)
  *H01M 4/08* (2006.01)

(52) U.S. Cl. .............. 429/223; 429/232; 423/594.19; 252/182.1

(58) Field of Classification Search .......... 429/223, 429/232; 423/594.19; 252/182.1
See application file for complete search history.

(56) References Cited

U.S. PATENT DOCUMENTS 6,020,088 A    2/2000  Singh (Continued)

FOREIGN PATENT DOCUMENTS

CN    1322383 A    11/2001

(Continued)

OTHER PUBLICATIONS

Chinese Office Action, with English translation, issued in Chinese Patent Application No. CN 200480016717X, mailed Jun. 29, 2007.

(Continued)

*Primary Examiner*—Patrick Ryan
*Assistant Examiner*—Karie O'Neill Apicella
(74) *Attorney, Agent, or Firm*—McDermott Will Emery LLP

(57) ABSTRACT

There is disclosed an alkaline battery including a positive electrode material mixture, a negative electrode, a separator interposed between the positive electrode material mixture and the negative electrode, and an alkaline electrolyte, wherein the positive electrode material mixture includes a first active material comprising nickel oxyhydroxide and a second active material comprising manganese dioxide, the nickel oxyhydroxide includes a γ-type crystal structure, the content of nickel in the nickel oxyhydroxide is not less than 45 wt %, and the average particle diameter on a volume basis of the nickel oxyhydroxide measured with a laser diffraction particle size distribution analyzer is 3 to 20 μm.

5 Claims, 2 Drawing Sheets

U.S. PATENT DOCUMENTS

| | | | |
|---|---|---|---|
| 6,235,428 B1 | 5/2001 | Yano et al. | |
| 6,566,009 B1 | 5/2003 | Noya et al. | |
| 7,122,169 B2 * | 10/2006 | Yamamoto et al. | 423/594.19 |
| 7,273,680 B2 * | 9/2007 | Durkot et al. | 429/223 |
| 2001/0051299 A1 | 12/2001 | Yano et al. | |
| 2002/0164527 A1 | 11/2002 | Tanigawa et al. | |

FOREIGN PATENT DOCUMENTS

| | | |
|---|---|---|
| CN | 1375885 A | 10/2002 |
| EP | 0 932 211 A | 7/1999 |
| EP | 1 195 824 A | 4/2002 |
| JP | 57-72266 | 5/1982 |
| JP | 02-030061 | 1/1990 |
| JP | 7-77129 | 8/1995 |
| JP | 10-214621 | 8/1998 |
| JP | 10-334913 | 12/1998 |
| JP | 11-260364 | 9/1999 |
| JP | 2001-015106 | 1/2001 |
| JP | 2001-322817 | 11/2001 |
| JP | 2003-017081 | 1/2003 |
| JP | 2003-123746 | 4/2003 |
| JP | 2003-257440 | 9/2003 |
| WO | WO 97/05666 | 2/1997 |
| WO | WO 97/19479 | 5/1997 |

OTHER PUBLICATIONS

European Search Report issued in European Patent Application No. EP 04799490 dated Nov. 25, 2008.

Oliva et al. "Review of the Structure and the Electrochemistry of Nickel Hydroxides and Oxy-Hydroxides", J. Power Sources 8, p. 229 (1982).

Bode et al. "Zur Kenntnis Der Nickelhydroxidelektrode—I Über Das Nickel (II)-Hydroxidhydrat", Electro chemical Acta 11, p. 1079 (1966).

* cited by examiner

ALKALINE BATTERY AND POSITIVE ELECTRODE MATERIAL FOR ALKALINE BATTERY COMPRISING NICKEL OXYHYDROXIDE AND MANGANESE DIOXIDE

This application is the U.S. National Phase under 35 U.S.C. §371 of International Application No. PCT/JP04/016311, filed Nov. 4, 2004, which in turn claims the benefit of Japanese Application No. 2003-376769, filed Nov. 6, 2003 and Japanese Application No. 2004-057222, filed Mar. 2, 2004, the disclosures of which Applications are incorporated by reference herein in their entirety.

TECHNICAL FIELD

The present invention relates to an alkaline battery that comprises a positive electrode material mixture comprising nickel oxyhydroxide and manganese dioxide, particularly to a nickel-manganese battery as a primary battery. The present invention also relates to a method for producing a positive electrode material for an alkaline battery comprising nickel oxyhydroxide.

BACKGROUND ART

Alkaline batteries, in particular, discharge starting type alkaline batteries or alkaline primary batteries have an inside-out type structure in which a cylindrical positive electrode material mixture pellet is disposed in a positive electrode case serving as a positive electrode terminal such that the pellet is in close contact with the positive electrode case, and a gelled zinc negative electrode is disposed in a hollow portion of the pellet with a separator interposed therebetween. With the recent widespread use of digital devices, the load power of the devices for which these batteries are used has been gradually increasing, and there has been a demand for batteries having excellent heavy load discharge characteristics. In response to such a demand, an alkaline battery whose heavy load discharge characteristics have been improved by mixing nickel oxyhydroxide into a positive electrode material mixture has been proposed, and this has been recently put into practical use (Japanese Unexamined Patent Publication No. Sho 57-72266).

On the other hand, in the field of alkaline storage batteries (secondary batteries), nickel oxyhydroxide that is obtained by oxidizing spherical or oval nickel hydroxide with an oxidizing agent such as a sodium hypochlorite aqueous solution is generally used. As the source material nickel hydroxide, nickel hydroxide having a high bulk density (tap density) and a β-type crystal structure are used. Nickel oxyhydroxide that is obtained by treating this with an oxidizing agent mainly has a β-type crystal structure, and can easily be filled at a high density inside a battery. The nickel oxyhydroxide having a β-type crystal structure has a nickel valence that is substantially 3, and the electrochemical energy generated when this changes to a valence near 2 is utilized as the discharge capacity of a battery.

For the purpose of increasing, for example, the utilization of the positive electrode and the heavy load discharge characteristics, there has also been proposed a technique that uses a solid solution nickel hydroxide in which cobalt, zinc or the like is dissolved, as the starting material (Japanese Examined Patent Publication No. Hei 7-77129).

Examples of the challenges that alkaline primary batteries containing nickel oxyhydroxide face are as follows:

(a) Improvement for the self decomposition (the decrease in the capacity and the increase in the internal pressure of the batteries) of nickel oxyhydroxide that occurs during storage of the batteries under a high temperature atmosphere.

(b) Improvement for the low discharge capacity (discharge duration) due to the small capacity per unit weight (mAh/g) of nickel oxyhydroxide.

In order to solve the above-described challenges, the following proposals have been made for the positive electrode material mixture of alkaline primary batteries.

First, from the viewpoint of improving the storage characteristics, it has been proposed to contain, in nickel oxyhydroxide, at least one oxide selected from the group consisting of a zinc oxide, a calcium oxide, an yttrium oxide and titanium dioxide (Japanese Unexamined Patent Publication No. 2001-15106).

Further, in the alkaline storage battery applications, it has been proposed to use a solid solution nickel hydroxide having a β-type crystal structure and including a transition metal such as manganese dissolved in its particles, as the starting material (International Publication No. WO 97/19479 and the specification of Japanese Patent No. 3239076). Here, nickel oxyhydroxide having a γ-type crystal structure and an average valence of nickel near 3.5 was intentionally formed during the charge reaction, thereby increasing the capacity significantly.

As a technique similar to this, for example, Japanese Unexamined Patent Publication No. 2001-322817 has proposed the use of particles of an α-type solid solution nickel hydroxide that was produced by coprecipitating ions of a transition metal such as manganese or iron that are in trivalent state with divalent nickel ions, as the starting material. Here, nickel oxyhydroxide having a γ-type crystal structure is formed during charge, thus increasing the capacity.

Further, it has been proposed to improve the discharge characteristics by coating the surface of particles of nickel oxyhydroxide having a γ-type crystal structure with a cobalt oxide having a high electrical conductivity (Japanese Unexamined Patent Publication Nos. Hei 10-334913 and Hei 11-260364).

However, any attempt to increase the capacity by using nickel oxyhydroxide having a γ-type crystal structure for the positive electrode has not yet been put to practical use for alkaline storage batteries. The reason lies in that a γ-type crystal excessively absorbs an electrolyte and thus expands in volume, so that the electrolyte distribution in the batteries greatly changes during the first several tens of charge/discharge cycles. When the electrolyte is localized on the positive electrode side and thus the electrolyte becomes insufficient in the separator, the internal resistance in the battery significantly increases.

On the other hand, the present inventors attempted to use, for primary batteries, nickel oxyhydroxide having a γ-type crystal structure, which has been investigated for alkaline storage batteries, and investigated the problems that could occur in such a case.

First, in the case of increasing the energy density of an alkaline primary battery containing nickel oxyhydroxide, one possible approach is to set strong chemical oxidation conditions for a source material nickel hydroxide having a β-type crystal structure, thereby increasing the nickel valence of the resulting nickel oxyhydroxide having a β-type crystal structure. Such an approach, however, can only provide nickel oxyhydroxide having a β-type crystal structure and in which the upper limit of the nickel valence is less than 3.00 to 3.05.

Then, it was found that the heavy load discharge characteristics tended to decrease more easily in the case of alkaline batteries as primary batteries that used nickel oxyhydroxide having a γ-type crystal structure, than in the case of alkaline batteries that used nickel oxyhydroxide having a β-type crystal structure, for the reasons shown in (a) to (c) below.

(a) The redox potential (equilibrium potential) of nickel oxyhydroxide having a γ-type crystal structure is lower than that of nickel oxyhydroxide having a β-type crystal structure.

(b) Nickel oxyhydroxide having a γ-type crystal structure undergoes a large volume change (change in the crystal structure) that is caused during discharge.

(c) The electron conductivity of nickel oxyhydroxide having a γ-type crystal structure and including manganese dissolved in its particles greatly decreases with discharge.

For primary batteries such as nickel-manganese batteries, nickel oxyhydroxide is added to the positive electrode material mixture, in order to compensate for the disadvantage of a low utilization of manganese dioxide during heavy load discharge. However, the above-described finding means that a γ-type crystal structure may significantly impair the advantage that nickel oxyhydroxide improves the heavy load discharge characteristics of alkaline batteries.

DISCLOSURE OF INVENTION

The present invention solves or reduces the above-described problems by optimizing the physical properties of nickel oxyhydroxide, thereby making it possible to increase the capacity of, and to improve the heavy load discharge characteristics of alkaline batteries, in particular nickel-manganese batteries.

The present invention also solves or reduces the above-described problems by adding a specific element to nickel oxyhydroxide, thereby making it possible to increase the capacity of, and to improve the heavy load discharge characteristics of alkaline batteries, in particular nickel-manganese batteries.

Furthermore, a subject matter of the present invention is to enhance the above-described effects by controlling the ratio of a γ-type crystal structure in nickel oxyhydroxide within a predetermined range.

The present invention relates to an alkaline battery comprising a positive electrode material mixture, a negative electrode, a separator interposed between the positive electrode material mixture and the negative electrode, and an alkaline electrolyte, wherein the positive electrode material mixture includes a first active material comprising nickel oxyhydroxide and a second active material comprising manganese dioxide, the nickel oxyhydroxide includes a γ-type crystal structure, the content of nickel in the nickel oxyhydroxide is not less than 45 wt %, and the average particle diameter on a volume basis of the nickel oxyhydroxide measured with a laser diffraction particle size distribution analyzer is 3 to 20 μm.

It is preferable that the nickel oxyhydroxide further includes a β-type crystal structure.

It is preferable that the tap density of the nickel oxyhydroxide after 500 times of tapping is not less than 1.5 g/cm$^3$.

It is preferable that the content of water in the nickel oxyhydroxide is not more than 3 wt %. It should be noted that water is considered to be adsorbed on the surface of the nickel oxyhydroxide.

It is preferable that the specific surface area of the nickel oxyhydroxide measured by a BET method is 10 to 30 m$^2$/g.

It is preferable that when a powder X-ray diffraction pattern of the nickel oxyhydroxide includes a diffraction peak $P_\gamma$ attributed to the (003) plane of a γ-type crystal having an interplanar spacing of 6.8 to 7.1 angstroms (Å) and a diffraction peak $P_\beta$ attributed to the (001) plane of a β-type crystal having an interplanar spacing of 4.5 to 5 angstroms (Å), an integrated intensity $I_\gamma$ of the diffraction peak $P_\gamma$ and an integrated intensity $I_\beta$ of the diffraction peak $P_\beta$ satisfy $0.5 \leq I_\gamma/(I_\gamma+I_\beta)$. In this case, the average valence of nickel included in the nickel oxyhydroxide is not less than 3.3.

It is preferable that when a powder X-ray diffraction pattern of the nickel oxyhydroxide includes a diffraction peak $P_\gamma$ attributed to the (003) plane of a γ-type crystal having an interplanar spacing of 6.8 to 7.1 angstroms (Å) and a diffraction peak $P_\beta$ attributed to the (001) plane of a β-type crystal having an interplanar spacing of 4.5 to 5 angstroms (Å), an integrated intensity $I_\gamma$ of the diffraction peak $P_\gamma$ and an integrated intensity $I_\beta$ of the diffraction peak $P_\beta$ satisfy $0.1 \leq I_\gamma/(I_\gamma+I_\beta) < 0.5$. In this case, the average valence of nickel included in the nickel oxyhydroxide is not less than 3.05 and less than 3.3.

It is preferable that the nickel oxyhydroxide is a solid solution in which an additive element is dissolved. In this case, it is preferable that the additive element is at least one selected from the group consisting of manganese and cobalt.

It is preferable that when the nickel oxyhydroxide is a solid solution in which manganese is dissolved as the additive element, the amount of manganese dissolved in the solid solution is 1 to 7 mol % of the total of all the metallic elements included in the solid solution.

It is preferable that when the nickel oxyhydroxide is a solid solution in which both manganese and cobalt are dissolved as the additive element, the amount of each of manganese and cobalt dissolved in the solid solution is 1 to 7 mol % of the total of all the metallic elements included in the solid solution.

It is further preferable that when the nickel oxyhydroxide is a solid solution in which manganese is dissolved as the additive element, the solid solution carries a cobalt oxide attached onto a surface thereof. In this case, it is preferable that the amount of manganese dissolved in the solid solution is 1 to 7 mol % of the total of all the metallic elements included in the solid solution, and that the amount of the cobalt oxide is 0.1 to 7 wt % of the solid solution. It is also preferable that the average valence of cobalt included in the cobalt oxide is greater than 3.0.

Preferably, the content of the manganese dioxide in the positive electrode material mixture is 20 to 90 wt %.

The present invention also relates to a method for producing a positive electrode material for an alkaline battery.

The production method according to the present invention includes a fist step of performing an operation of supplying a nickel (II) sulfate aqueous solution, a manganese (II) sulfate aqueous solution, a sodium hydroxide aqueous solution and ammonia water into a reaction vessel provided with a stirring blade through separate channels, while bubbling an inert gas and adjusting the temperature and pH in the reaction vessel, thereby obtaining nickel hydroxide including a β-type crystal structure in which nickel sites are partly replaced with divalent manganese.

The above-described method also includes a second step of washing with water and drying the nickel hydroxide that has been obtained by the first step, followed by heating at 50 to 150° C. under an oxidizing atmosphere, thereby oxidizing manganese to an average valence of not less than 3.5.

The above-described method also includes a third step of introducing the nickel hydroxide that has been subjected to the second step into an alkaline aqueous solution, together with an oxidizing agent, thereby chemically oxidizing the nickel hydroxide.

It is preferable that, in the first step, hydrazine is further added into the reaction vessel to maintain a reducing atmosphere.

It is preferable that, in the second step, the average valence of manganese is set to not less than 3.8.

It is preferable that the oxidizing agent used in the third step is hypochlorite.

It is preferable that the alkaline aqueous solution used in the third step is an aqueous solution in which at least one alkali salt selected from the group consisting of potassium hydroxide, sodium hydroxide and lithium hydroxide is dissolved. In this case, it is preferable that the concentration of the alkali salt in the alkaline aqueous solution is not less than 3 mol/L.

Hereinafter, nickel oxyhydroxide including a γ-type crystal structure is occasionally referred to as "γ-nickel oxyhydroxide", nickel oxyhydroxide including a β-type crystal structure as "β-nickel oxyhydroxide", and nickel hydroxide including a β-type crystal structure as "β-nickel hydroxide".

With the present invention, it is possible to increase the capacity of an alkaline battery in which the positive electrode material mixture contains nickel oxyhydroxide, while maintaining the advantage of having excellent heavy load discharge characteristics.

Controlling the content of nickel contained in γ-nickel oxyhydroxide and average particle diameter is particularly effective in increasing the capacity of alkaline batteries.

By controlling the content of nickel and average particle diameter, the volume energy density (mAh/cm$^3$) of a positive electrode material mixture pellet comprising nickel oxyhydroxide and manganese dioxide can be by far superior to that of the conventional ones using β-nickel oxyhydroxide and manganese dioxide. Accordingly, the capacity of alkaline batteries increases significantly.

Additionally, dissolving an additive element in nickel oxyhydroxide is particularly effective in improving the heavy load discharge characteristics of alkaline batteries.

As the additive element, manganese is particularly effective, and the use of a solid solution nickel hydroxide in which a small amount of manganese is dissolved for a nickel oxyhydroxide source material provides a low redox potential, promotes the oxidation of the nickel hydroxide, and facilitates the production of a γ-type crystal structure.

Moreover, with the method for producing a positive electrode material according to the present invention, manganate ions ($MnO_4^{2-}$), permanganate ions ($MnO_4^-$) or the like are difficult to be dissolved into the reaction atmosphere at the time of oxidizing nickel hydroxide to nickel oxyhydroxide. Accordingly, the degree of oxidation of nickel tends not to vary. In other words, with the production method of the present invention, manganese can be present in a stable state in nickel oxyhydroxide, so that the quality of the resulting battery can be maintained stably.

BEST MODE FOR CARRYING OUT THE INVENTION

Figure 1:
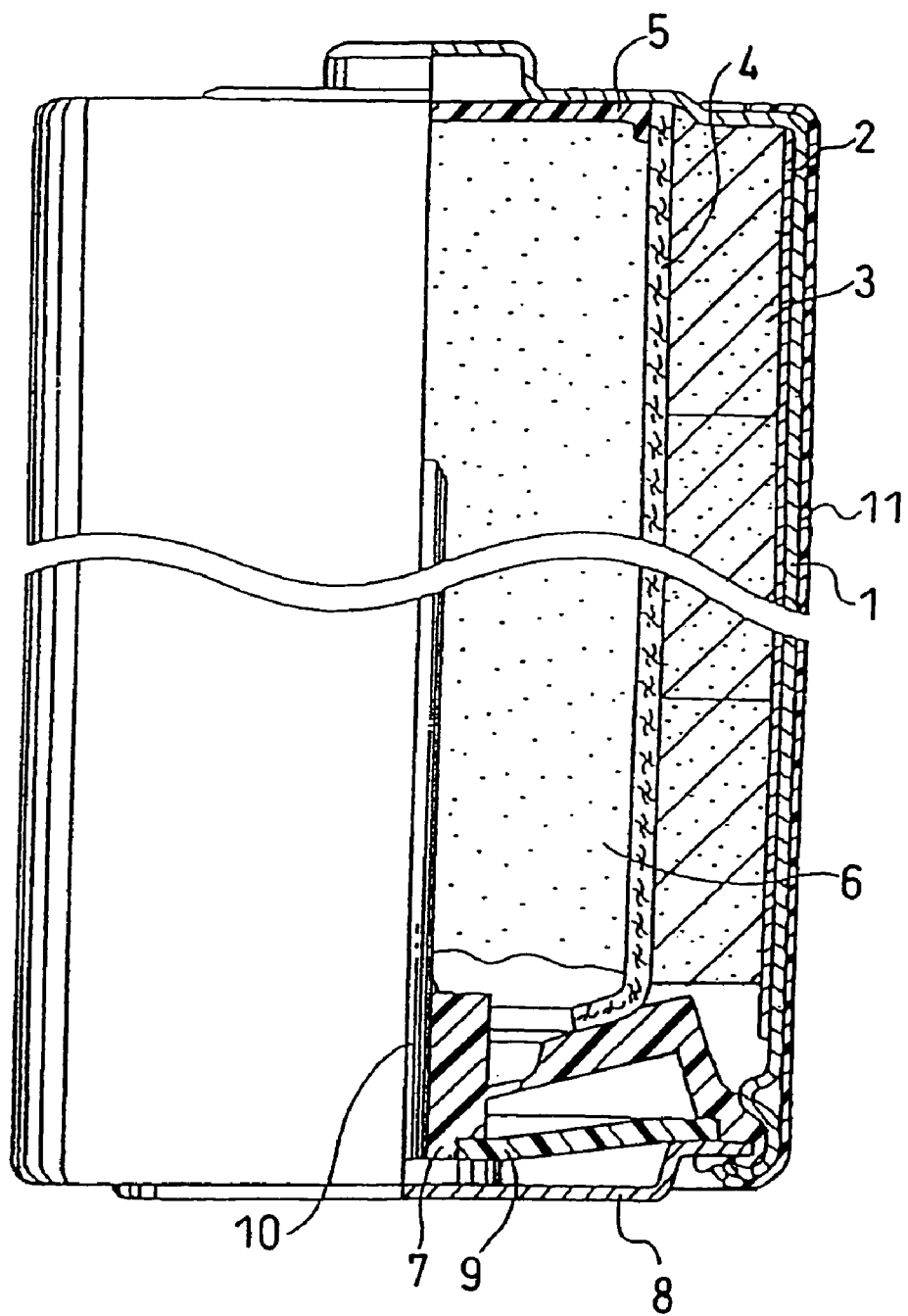
FIG. 1 is a front view, partly in cross section, of an alkaline battery according to the examples of the present invention.

The alkaline battery according to the present invention comprises a positive electrode material mixture, a negative electrode, a separator interposed between the positive electrode material mixture and the negative electrode, and an alkaline electrolyte. The positive electrode material mixture includes a first active material comprising nickel oxyhydroxide and a second active material comprising manganese dioxide, and the nickel oxyhydroxide includes a γ-type crystal structure.

From the viewpoint of increasing the capacity of the alkaline battery, it is necessary that the content of nickel in the nickel oxyhydroxide should be not less than 45 wt %, preferably not less than 50 wt %. Further, from the viewpoint of enabling the production of the positive electrode material mixture pellet during actual manufacturing, it is necessary that the average particle diameter on a volume basis measured with a laser diffraction particle size distribution analyzer should be 3 to 20 μm, preferably 10 to 15 μm.

The nickel oxyhydroxide used in the present invention may comprise a single phase including a γ-type crystal structure, or may comprise a eutectic material in which both a β-type crystal structure and a γ-type crystal structure are present.

The γ-type crystal structure is a structure in which alkaline metal ions (ions A) are inserted between the $NiO_2$ layers constituting the nickel oxyhydroxide. In this structure, the electrical neutrality is maintained among the elements or ions, namely, A, H, Ni and O, constituting the nickel oxyhydroxide. γ-nickel oxyhydroxide is an oxide represented by a chemical formula: $A_xH_yNiO_2 \cdot nH_2O$ (J. Power Sources 8, p. 229(1982)).

In a powder X-ray diffraction, γ-nickel oxyhydroxide provides a diffraction pattern described in the JCPDS inorganic material file, File No. 6-75. One example of the typical diffraction peaks is a diffraction peak $P_\gamma$ attributed to the (003) plane having a interplanar spacing of 6.8 to 7.1 angstroms (Å). The (003) plane is a crystal plane that is perpendicular to the c-axis, and alkaline metal ions, water molecules and the like are inserted between the interlayer spaces, thereby elongating the interlayer spaces to nearly 7 Å.

On the other hand, in a powder X-ray diffraction of β-nickel oxyhydroxide, a diffraction peak $P_\beta$ attributed to the (001) plane having an interplanar spacing of 4.5 to 5 Å is observed as a typical diffraction peak.

In terms of the amount of the positive electrode material mixture filled in the battery, the nickel oxyhydroxide used in the present invention has a tap density after 500 times of tapping of preferably not less than 1.5 g/cm$^3$, more preferably not less than 1.7 g/cm$^3$.

Furthermore, from the viewpoint of maintaining, for example, the distribution of the alkaline electrolyte in the positive electrode material mixture at a favorable state, allowing the discharge reaction (electrochemical reaction) of the nickel oxyhydroxide to proceed smoothly, and increasing the high load discharge characteristics, the specific surface area measured by using a BET method is preferably 10 to 30 m$^2$/g, more preferably 15 to 20 m$^2$/g.

Further, the content of water in the nickel oxyhydroxide is preferably not more than 3 wt %. It is particularly preferable to use nickel oxyhydroxide having a water content of not more than 2 wt %, since this facilitates the production of the positive electrode material mixture pellet.

When the above-described nickel oxyhydroxide includes a β-type crystal structure, a powder X-ray diffraction pattern of the nickel oxyhydroxide includes a diffraction peak $P_\beta$ attributed to the (001) plane of a β-type crystal having an interplanar spacing of about 4.5 to 5 Å, in addition to the above-described diffraction peak $P_\gamma$ attributed to the (003) plane of a γ-type crystal.

When the integrated intensity $I_\gamma$ of the diffraction peak $P_\gamma$ and the integrated intensity $I_\beta$ of the diffraction peak $P_\beta$ satisfy $0.5 \leq I_\gamma/(I_\gamma+I_\beta)$, a significant effect of increasing the capacity is achieved. Specifically, the average valence of nickel included in the nickel oxyhydroxide becomes not less than 3.3. When the average valence of nickel included in the nickel oxyhydroxide is not less than 3.3, γ-nickel oxyhydroxide provides a large amount of the discharge capacity corresponding to their valence, making it possible to achieve a significant increase in the capacity of the battery.

On the other hand, when $I_\gamma/(I_\gamma+I_\beta)$ is less than 0.5, it is possible to increase the capacity, but the effect thereof is reduced. In this case, the average valence of nickel included in the nickel oxyhydroxide is not less than 3.05 and less than 3.3. However, in the case where $0.1 \leq I_\gamma/(I_\gamma+I_\beta)<0.5$, the bulk density (tap density) of the particles can be maintained high, and therefore, there is an advantage that the positive electrode material mixture pellet is easy to produce and can be readily filled in the battery.

Generally, in the case of obtaining nickel oxyhydroxide by highly oxidizing nickel hydroxide, it is often the case that a eutectic material of β-nickel oxyhydroxide (the main component) and a small amount of γ-nickel oxyhydroxide is obtained which shows little elongation of the interlayer spaces of the crystal planes perpendicular to the c-axis. However, the present invention also gives importance to the cases where a single phase of γ-nickel oxyhydroxide, or a eutectic material of γ-nickel oxyhydroxide (the main component) and a small amount of β-nickel oxyhydroxide, is actively used as the positive electrode material.

Nickel oxyhydroxide including a γ-type crystal structure does not necessarily have a discharge capacity corresponding to its nickel valence. As compared with β-nickel oxyhydroxide, γ-nickel oxyhydroxide often may cause a significant decrease in the discharge voltage, and thus fails to provide a sufficient capacity.

Therefore, the present invention proposes the use of a solid solution in which an additive element such as manganese is dissolved, as the nickel oxyhydroxide including a γ-type crystal structure. A solid solution nickel oxyhydroxide in which an additive element is dissolved can be synthesized by oxidizing a solid solution nickel hydroxide in which an additive element is dissolved. As the additive element, cobalt can be preferably used, in addition to manganese.

A solid solution γ-nickel oxyhydroxide in which manganese is dissolved can provide a sufficient capacity during reducing highly oxidized nickel to a valence near 2 in a relatively high potential region, although the detailed reaction mechanism has not been elucidated. Since it is possible to utilize the discharge reaction of nickel involving more than one electron, the use of the nickel oxyhydroxide including a γ-type crystal structure and in which manganese is dissolved, as the positive electrode material is effective in increasing the battery capacity. The presence of manganese allows the oxidation state of the nickel oxyhydroxide, i.e., the amount of electricity held, to be improved sufficiently.

When manganese is dissolved in nickel oxyhydroxide to form a solid solution, the redox potential at which nickel becomes divalent to quadrivalent shifts to a lower value. Furthermore, quadrivalent manganese ions that are present in the nickel layers of the nickel oxyhydroxide stabilize the γ-type crystal structure thermodynamically. Accordingly, at the time of synthesizing the nickel oxyhydroxide, the ratio of the γ-type crystal structure that is produced becomes high, and it is therefore possible to obtain nickel oxyhydroxide having a high average valence of nickel.

When cobalt is dissolved in nickel oxyhydroxide to form a solid solution, a defect that is suitable for proton diffusion can be formed in the crystal ($NiO_2$ layers) during the discharge process of nickel. Moreover, the electron conductivity of the nickel oxyhydroxide itself is improved. Accordingly, it is possible to significantly increase the capacity of the alkaline battery, without impairing the heavy load discharge characteristics.

Although the nickel oxyhydroxide is preferably a solid solution in which at least one of manganese and cobalt is dissolved, it is more preferably a solid solution in which both manganese and cobalt are dissolved. When both manganese and cobalt are dissolved in the nickel oxyhydroxide, it is possible to increase both the effect of increasing the capacity and improving the heavy load discharge characteristics at the same time.

When the nickel oxyhydroxide is a solid solution in which manganese is dissolved as the additive element, the amount of manganese dissolved in the solid solution is preferably 1 to 7 mol % of the total of all the metallic elements contained in the solid solution. When the amount of manganese is less than 1 mol %, only a little effect of the additive element can be obtained. On the other hand, in the viewpoint of avoiding a decrease in the battery capacity, the amount of manganese is preferably not more than 7 mol %.

When the nickel oxyhydroxide is a solid solution in which cobalt is dissolved as the additive element, the amount of cobalt dissolved in the solid solution is preferably 1 to 7 mol % of the total of all the metallic elements contained in the solid solution. When the amount of cobalt is less than 1 mol %, only a little effect of the additive element can be obtained. On the other hand, from the viewpoint of avoiding a decrease in the battery capacity, the amount of cobalt is preferably not more than 7 mol %.

When the nickel oxyhydroxide is a solid solution in which both manganese and cobalt are dissolved as the additive element, the amount of each of manganese and cobalt dissolved in the solid solution is preferably 1 to 7 mol % of the total of all the metallic elements contained in the solid solution.

From the viewpoint of maintaining the heavy load discharge characteristics, it is also effective to attach a cobalt oxide to the surface of the nickel oxyhydroxide. The cobalt oxide attached onto the surface of the nickel oxyhydroxide serves to maintain a favorable current collecting state from the active material during the discharge of the γ-nickel oxyhydroxide that involves a volume change, thus maintaining the heavy load discharge characteristics.

From the viewpoint of maintaining a favorable current collecting state from the active material, the amount of the cobalt oxide is preferably not less than 0.1 wt % of the nickel oxyhydroxide. In addition, from the viewpoint of suppressing the dissolution of cobalt at the time of storing the battery at a high temperature to ensure the stability (reliability) of the positive electrode, the amount of the cobalt oxide is preferably not more than 7 wt % of the nickel oxyhydroxide.

The average valence of cobalt included in the cobalt oxide is preferably greater than 3.0. A cobalt oxide in which the average valence of cobalt is greater than 3.0 has extremely higher electron conductivity than a cobalt oxide in which the average valence of cobalt is not more than 3.0. Accordingly, it is possible to maximize the current collection efficiency from the nickel oxyhydroxide. Such a cobalt oxide also inhibits cobalt from being reduced to a valence of 2 or dissolved into the electrolyte when the discharged battery is left (stored). Therefore, by using nickel oxyhydroxide with such a cobalt oxide attached onto the surface, it is also possible to improve the storage characteristics (reliability) of the battery, in addition to increasing the capacity and improving the heavy load discharge characteristics.

Manganese dioxide can be more easily filled in the battery case at a high density than nickel oxyhydroxide, and the price of manganese dioxide is low. In view of these facts, the content of the manganese dioxide in the positive electrode material mixture is not less than 20 wt %. Further, from the viewpoint of increasing the battery capacity, the content of the manganese dioxide in the positive electrode material mixture is preferably not more than 90 wt %.

Nickel oxyhydroxide including a γ-type structure can be obtained by chemically oxidizing nickel hydroxide composed mainly of a β-type structure in an alkaline aqueous solution using an oxidizing agent, and washing this with water and drying.

Here, according to a Bode diagram (Electrochemical Acta 11, p. 1079(1966)) relating to the charge/discharge of commonly used nickel hydroxide, it seems that nickel oxyhydroxide composed mainly of a γ-type structure can be easily obtained when nickel hydroxide ($\alpha$-$3Ni(OH)_2 \cdot 2H_2O$) with an α-type structure is used as the starting material.

However, nickel hydroxide including an α-type structure generally is extremely bulky, and its interplanar distance for the (003) planes perpendicular to the c-axis is more than 8 angstroms, and this interplanar distance is larger than that of γ-nickel hydroxide. Therefore, the shape (hysteresis) of the source material is reflected on nickel oxyhydroxide including a γ-type structure that is obtained by oxidizing nickel hydroxide including an α-type structure; accordingly, the material has an increased porosity, and it is therefore not possible to achieve powder with high density.

Therefore, the present invention proposes the use of nickel hydroxide composed mainly of a high-density β-type structure (e.g., nickel hydroxide not less than 90 wt % of which is composed of a β-type structure), as the source material of nickel oxyhydroxide including a γ-type structure. Nickel oxyhydroxide composed mainly of a γ-type structure is relatively dense, and thus is effective for filling the active material in the battery at a high density.

As the alkaline aqueous solution, it is preferable to use at least one selected from the group consisting of potassium hydroxide, sodium hydroxide and lithium hydroxide. A reaction that forms nickel oxyhydroxide composed mainly of a γ-type structure proceeds, while being accompanied by insertion of alkaline metal ions into the $NiO_2$ layers. For this reason, the reaction proceeds more smoothly, when the concentration of alkali salts that are present together with the oxidizing agent is high. Therefore, the concentration of these alkali salts in the alkaline aqueous solution is preferably not less than 3 mol/L.

The nickel hydroxide composed mainly of a β-type structure for use as the source material of nickel oxyhydroxide including a γ-type structure is preferably a solid solution in which manganese is dissolved.

The redox potential of a solid solution nickel hydroxide in which manganese is dissolved shifts to a lower value than that of commonly used nickel hydroxide, so that it tends to be highly oxidized to form a γ-type structure in a treatment using an oxidizing agent.

As compared with the state in which manganese is present as an oxide in nickel hydroxide and forms a eutectic material with the nickel hydroxide, the state of a solid solution in which manganese is dissolved in nickel hydroxide is superior in that leaching out of manganese hardly occurs during the treatment using an oxidizing agent.

Further, as compared with the state of a solid solution in which manganese is inserted into a location other than the nickel sites in the nickel hydroxide crystal, the state of a solid solution in which manganese is substituted for the nickel sites of the nickel hydroxide is superior in that leaching out of manganese hardly occurs during the treatment using an oxidizing agent.

In addition, when manganese is leached out as manganate ions ($MnO_4^{2-}$), permanganate ions ($MnO_4^-$) or the like at the time of treating the nickel hydroxide with an oxidizing agent, the degree of oxidation of nickel varies. In the case of using a solid solution nickel hydroxide in which nickel sites are partly replaced with manganese, such a phenomenon is prevented, and thus leaching out of manganese hardly occurs.

The average valence of manganese in the β-nickel hydroxide immediately before the treatment with an oxidizing agent is preferably not less than 3.5, more preferably not less than 3.8. When the average valence of manganese is as low as 2 to 3, a manganese oxide might be liberated locally in the nickel oxyhydroxide particles. Although the details of the reason are not known, manganese species, for example, move in the crystal during the oxidation treatment, thereby forming an oxide. In that case, it is difficult to obtain γ-nickel oxyhydroxide having discharge efficiency that is high enough to contribute to an increase in the battery capacity. Therefore, the average valence of manganese is preferably close to 4.

Next, an example of the efficient method for producing nickel oxyhydroxide including a γ-type crystal structure and in which manganese is dissolved in a suitable state will be described.

First Step

First, a nickel (II) sulfate aqueous solution, a manganese (II) sulfate aqueous solution, a sodium hydroxide aqueous solution and ammonia water are supplied into a reaction vessel provided with a stirring blade through separate channels. This operation is carried out while bubbling an inert gas in the reaction vessel and adjusting the temperature and pH in the reaction vessel. Through this operation, it is possible to provide nickel hydroxide having a β-type crystal structure and in which nickel sites are partly replaced with divalent manganese.

The concentrations of the solutions to be supplied to the reaction vessel need to be appropriately adjusted by a person with the ordinary skill in the art, according to the equipment such as the reaction vessel, and such an adjustment can be performed freely by a person skilled in the art. Examples of the commonly used concentrations include 0.5 to 2 mol/L for nickel (II) sulfate, 1 to 5 mol/L for sodium hydroxide, and 10 to 30 wt % for ammonia water; however, the concentrations are not limited to these. The concentration of manganese (II) sulfate may be selected such that the desired content of nickel can be achieved.

Nitrogen, argon or the like is used as the inert gas. By stirring the source material solutions while bubbling the inert gas, nickel and manganese that are in a divalent state form an ammine complex, and the sodium hydroxide aqueous solution that is excessively supplied to the ammine complex exert an action, thereby precipitating nickel hydroxide composed mainly of a β-type structure and in which divalent nickel sites are partly replaced with manganese. Nickel hydroxide in which manganese is dissolved may decrease in density in many cases, and the main cause of this is that divalent manganese ions are oxidized in the middle of the production of the nickel hydroxide. On the other hand, a β-nickel hydroxide with a very high density can be obtained by performing the synthesis under an inert gas atmosphere as described above.

From the viewpoint of maintaining a reducing atmosphere in the reaction vessel, it is preferable that, in the first step, hydrazine is further added into the reaction vessel. By controlling the atmosphere in such a manner, the oxidation of manganese ions during synthesis is suppressed even further, making it possible to reliably obtain β-nickel hydroxide in which divalent manganese is substituted for a portion of the nickel sites.

Second Step

Next, the β-nickel hydroxide obtained by the fist step is washed with water, dried, and heated at 50 to 150° C. under an oxidizing atmosphere. Through this operation, only manganese can be oxidized to an average valence of not less than 3.5.

When the valence of manganese in the β-nickel hydroxide remains at 2, a manganese oxide might be liberated locally in the nickel oxyhydroxide particles during storage at room temperature and atmospheric pressure before the oxidation treatment, or during the oxidation treatment, so that sufficient characteristics may not be obtained at a later time. On the other hand, when manganese is converted into a state of a valence of 3.5 or more after the first step, manganese can be stably present in the nickel sites of the β-nickel hydroxide.

Third Step

Next, the nickel hydroxide that has undergone the second step is introduced into an alkaline aqueous solution, together with an oxidizing agent, and thereby the nickel hydroxide is chemically oxidized. Through this operation, it is possible to obtain nickel oxyhydroxide including a γ-type crystal structure.

In γ-nickel oxyhydroxide, alkali metal ions are inserted between the $NiO_2$ layers of the nickel oxyhydroxide, thus maintaining the electrical neutrality of tetravalent nickel ions. Therefore, it is necessary to perform the treatment using an oxidizing agent in an aqueous solution containing alkali metal ions. However, since most anion species other than $OH^-$ (e.g., $SO_4^{2-}$, $NO_3^-$ and $Cl^-$) adversely affect the battery characteristics, it is practically essential that the treatment be performed in an alkaline aqueous solution.

As the alkaline aqueous solution, it is preferable to use at least one alkali salt selected from the group consisting of potassium hydroxide, sodium hydroxide and lithium hydroxide, as described above. Furthermore, from the viewpoint of improving the production efficiency of the γ-nickel oxyhydroxide, the concentration of the alkali salt in the alkaline aqueous solution is preferably not less than 3 mol/L.

As the oxidizing agent for oxidizing nickel hydroxide to nickel oxyhydroxide, it is possible to use, for example, hypochlorites such as sodium hypochlorite, persulfates such as potassium peroxydisulfate, halogens such as bromine, and a hydrogen peroxide solution. Among them, hypochlorites are most suitable, since they are highly oxidative, stable, and low in price.

Hereinafter, the present invention will be described specifically by way of examples.

First, the method for measuring the physical properties of nickel oxyhydroxide, or a source material nickel hydroxide will be described.

<1> Powder X-Ray Diffraction Measurement

X-ray diffraction profiles (diffraction patterns) of the various types of powder were obtained for the range of 2θ=10 to 70 degrees (deg.) under the measurement conditions described below, using a powder X-ray diffraction apparatus "RINT1400" manufactured by Rigaku Corporation.

(Anticathode) Cu (Filter) Ni (Tube voltage) 40 kV (Tube current) 100 mA (Sampling angle) 0.02 deg.

(Scanning rate) 3.0 deg./min.

(Divergence slit) ½ deg.

(Scattering slit) ½ deg.

From each of the diffraction patterns, an integrated intensity $I_\gamma$ of a diffraction peak $P_\gamma$ attributed to the (003) plane of a γ-type crystal having an interplanar spacing near 6.8 to 7.1 Å, and an integrated intensity $I_\beta$ of a diffraction peak $P_\beta$ attributed to the (001) plane of a β-type crystal having an interplanar spacing of 4.5 to 5 Å were obtained, and then the value of $I_\gamma/(I_\gamma+I_\beta)$ was obtained.

<2> Nickel Content

The content of nickel in each of the sample powders was determined by the following chemical measurement based on a gravimetric method.

A nitric acid aqueous solution was added to a sample powder of nickel oxyhydroxide or nickel hydroxide, and the whole was heated to dissolve the particles completely, followed by adding a tartaric acid aqueous solution and ion exchanged water to adjust the volume. After the pH of this solution was adjusted using ammonia water and acetic acid, potassium bromate was added, and thereby the additive element (manganese ions or cobalt ions) that could cause measurement error was brought into a higher oxidation state.

Next, an ethanol solution of dimethylglyoxime was added to this solution under stirring, thus precipitating the nickel (II) ions as a complex compound of dimethylglyoxime. Subsequently, suction filtration was performed, and the produced precipitate was collected and dried in an atmosphere at 110° C., and the weight of the precipitate was measured. From the measurement result, the content of nickel in each of the powders was calculated using the following expression:

Content of nickel (wt %)={weight of precipitate (g)× 0.2032}/{weight of sample powder (g)}

<3> Average Valence of Nickel

When the nickel oxyhydroxide did not contain any additive element such as manganese or cobalt, potassium iodide and sulfuric acid are added to the sample powder of the nickel oxyhydroxide, and they were completely dissolved by performing continuous stirring sufficiently. During this process, nickel ions having a high valence oxidized the potassium iodide to librate iodine, and the nickel ions themselves were reduced to a valence of 2. Subsequently, the iodine that had been produced and liberated was titrated using a 0.1 mol/L sodium thiosulfate aqueous solution. The titer at this time reflected the amount of nickel ions having a valence greater than 2. Using the result of the titration and the content of nickel obtained in <2> described above, the average valence of the nickel included in the nickel oxyhydroxide was calculated with the following expression:

Average valence of nickel={titer (L)×0.1 (mol/L)× 58.69}/{weight of nickel oxyhydroxide (g)×content of nickel}+2.00

When the nickel oxyhydroxide is a solid solution containing an additive element (manganese or cobalt), manganese ions or cobalt ions having a high valence also oxidize the potassium iodide to librate iodine, and the manganese ions or cobalt ions themselves are reduced to a valence of 2, so that it is necessary to make a correction for this.

Therefore, in the case of a solid solution nickel oxyhydroxide in which an additive element was dissolved, a nitric acid aqueous solution was added to this and heating was performed to completely dissolve the particles, and thereafter, ICP emission spectrometry was performed on the resulting solution to quantify the content of the additive element. For the ICP emission spectrometry, a VISTA-RL manufactured by VARIAN, INC. was used. Assuming that the average valence of manganese included in the nickel oxyhydroxide was 4, and the average valence of cobalt was 3.5, the above-described titer was corrected using the result of the ICP emission spectrometry, thereby calculating the average valence of the nickel.

In addition, the average valence of manganese included in the solid solution of the source material nickel hydroxide before it had been oxidized to the nickel oxyhydroxide was determined by a redox titration that was basically the same as described above, using the values of the contents of the additive elements obtained by the ICP emission spectrometry, and assuming that nickel was divalent and cobalt was divalent.

<4> Tap Density

For the measurement of the tap density, a measurement apparatus "Powder Tester PT-R" manufactured by Hosokawa Micron Corporation was used. Using a sieve with a mesh opening of 100 μm as the sieve for passing the sample powders through, each powder was dropped into a 20 cc tapping cell. After the cell was filled up, tapping was carried out 500 times at a rate of one time per second with a stroke length of 18 mm. Thereafter, the tap density was measured.

<5> Average Particle Diameter

Using a Microtrack particle size distribution measurement apparatus "9220 FRA" manufactured by NIKKISO CO., LTD., each sample powder was sufficiently dispersed in water, and the average particle diameter $D_{50}$ on a volume basis was determined by a laser diffraction method.

<6> Water Content

Using a dry measure type moisture meter "CZA-2100" manufactured by CHINO CORPORATION, 5 g of each sample powder was heat-dried at 120° C., and thereafter, the content of water (wt %) in the sample was measured.

<7> BET Specific Surface Area

After About 2 g of each sample powder was preliminarily dried by being evacuated for six hours under heating at 60° C., a nitrogen gas was adsorbed by the sample, and the absorbed amount was measured using an "ASAP2010" manufactured by Micromeritics Instrument Corporation. Furthermore, the weight of the sample powder was precisely weighed, and the specific surface area was determined by a BET method.

Example 1

[1] Production of Nickel Hydroxide (1) Nickel Hydroxide a1

A nickel (II) sulfate aqueous solution, a sodium hydroxide aqueous solution and ammonia water having predetermined concentrations were prepared. They were supplied with pumps into a reaction vessel provided with a stirring blade such that the pH in the vessel was constant, and continuous stirring was performed sufficiently, thereby precipitating and growing spherical β-nickel hydroxide.

Subsequently, the resulting particles were heated in a sodium hydroxide aqueous solution that was different from the one described above to remove sulfate ions, followed by washing with water and drying, thereby producing a nickel hydroxide a1.

(2) Nickel Hydroxide b1

Pure water and a small amount of hydrazine (reducing agent) were added into a reaction vessel provided with a stirring blade, and bubbling with a nitrogen gas was started. Additionally, a nickel (II) sulfate aqueous solution, a manganese (II) sulfate aqueous solution, a sodium hydroxide aqueous solution and ammonia water having predetermined concentrations were prepared. They were supplied with pumps into the above-described reaction vessel such that the pH in the vessel was constant, and continuous stirring was performed sufficiently, thereby precipitating and growing a solid solution comprising spherical β-nickel hydroxide in which manganese was dissolved.

Subsequently, the resulting particles were heated in a sodium hydroxide aqueous solution that was different from the one described above to remove sulfate ions, followed by washing with water and vacuum drying, and they were further subjected to air oxidation at 80° C. for 72 hours, thereby producing a nickel hydroxide b1 [composition: $Ni_{0.95}M_{0.05}(OH)_2$]. Here, the air oxidation was a treatment for oxidizing only Mn to a valence near 4

(3) Nickel Hydroxide c1

Pure water and a small amount of hydrazine (reducing agent) were added into a reaction vessel provided with a stirring blade, and bubbling with a nitrogen gas was started. Additionally, a nickel (II) sulfate aqueous solution, a manganese (II) sulfate aqueous solution, a cobalt (II) sulfate aqueous solution, a sodium hydroxide aqueous solution and ammonia water having predetermined concentrations were prepared. They were supplied with pumps into the above-described reaction vessel such that the pH in the vessel was constant, and continuous stirring was performed sufficiently, thereby precipitating and growing a solid solution comprising spherical β-nickel hydroxide in which manganese and cobalt were dissolved.

Subsequently, the resulting particles were heated in a sodium hydroxide aqueous solution that was different from the one described above to remove sulfate ions, followed by washing with water and vacuum drying, and they were further subjected to air oxidation at 80° C. for 72 hours, thereby producing a nickel hydroxide c1 [composition: $Ni_{0.90}Mn_{0.05}Co_{0.05}(OH)_2$].

(4) Nickel Hydroxide d1

After the nickel hydroxide b1 was introduced into a cobalt sulfate aqueous solution in a reaction vessel, a sodium hydroxide aqueous solution was gradually added thereto, and the whole was continuously stirred at 35° C. while adjusting the pH in the vessel such that it was maintained at 10, thus precipitating cobalt hydroxide on the surface of the solid solution particles. Thereby, a nickel hydroxide d1 was produced, which was the nickel hydroxide b1 coated with $Co(OH)_2$. The nickel hydroxide d1 was washed with water, and thereafter subjected to vacuum drying.

Here, the amount of the cobalt hydroxide attached onto the surface of the nickel hydroxide b1 was 5.0 parts by weight per 100 parts by weight of the nickel hydroxide b1.

Each of the nickel hydroxides a1 to d1 had an average particle diameter of about 12 μm, a BET specific surface area in the range of 10 to 12 $m^2/g$, a tap density in the range of 2.1 to 2.2 $g/cm^3$.

[2] Oxidation of Nickel Hydroxide to Nickel Oxyhydroxide

After 200 g of the nickel hydroxide a1 was introduced into 1 L of a 5 mol/L sodium hydroxide aqueous solution, a sufficient amount of a sodium hypochlorite aqueous solution (effective chlorine concentration: 5 wt %) serving as an oxidizing agent was added thereto, and the whole was stirred to convert the nickel hydroxide to nickel oxyhydroxide. The resulting particles were sufficiently washed with water, followed by vacuum drying at 60° C. (24 hours), thereby producing a nickel oxyhydroxide A1.

Further, nickel oxyhydroxides B1, C1 and D1 were produced by performing a process similar to that described above, using the nickel hydroxides b1, c1 and d1, respectively, in place of the nickel hydroxide a1.

[3] Analysis of Physical Properties of Nickel Oxyhydroxides

Table 1 shows the values of $I_\gamma/(I_\gamma+I_\beta)$ and the average valences of nickel obtained for the nickel oxyhydroxides A1 to D1.

TABLE 1

| Nickel oxyhydroxide | Nickel hydroxide source material | $I_\gamma/(I_\gamma + I_\beta)$ value | Average valence of nickel |
|---|---|---|---|
| Nickel oxyhydroxide A1 | Nickel hydroxide a1 | 0.08 | 3.04 |
| Nickel oxyhydroxide B1 | Nickel hydroxide b1 | 0.79 | 3.41 |
| Nickel oxyhydroxide C1 | Nickel hydroxide c1 | 0.81 | 3.40 |
| Nickel oxyhydroxide D1 | Nickel hydroxide d1 | 0.78 | 3.41 |

From Table 1, the following can be stated.

First, in the case of the nickel oxyhydroxide A1, which contained no manganese or cobalt, the production ratio of the γ-nickel oxyhydroxide was very small, and the chemical oxidation of nickel was suppressed to such a level that the valence was near 3.

On the other hand, in each of the cases of the solid solution nickel oxyhydroxides B1 to D1, in which manganese was dissolved, the value of $I_\gamma/(I_\gamma+I_\beta)$ was near 0.8, and the average valence of nickel was increased to about 3.4.

[4] Fabrication of Alkaline Battery

Nickel-manganese batteries as primary batteries were fabricated using the nickel oxyhydroxides A1 to D1, respectively. FIG. 1 is a front view, partly in cross section, of a battery fabricated in this example.

The batteries using the nickel oxyhydroxides A1 to D1 were named batteries A1 to D1, respectively.

(1) Production of Positive Electrode Material Mixture Pellet

Predetermined nickel oxyhydroxide, manganese dioxide and graphite were mixed at a weight ratio of 50:50:5, and zinc oxide was added to the mixture, in an amount corresponding to 5 wt % of the nickel oxyhydroxide a2. Further, 1 part by weight of an alkaline electrolyte (a 40 wt % potassium hydroxide aqueous solution) was added, per 100 parts by weight of the total of the nickel oxyhydroxide a2 and the manganese dioxide. Thereafter, the mixture was formed into particulates by stirring and mixing the mixture in a mixer until it became homogeneous. The resulting particulates were molded into the shape of a hollow short cylinder, thereby producing a positive electrode material mixture pellet.

(2) Assembly of Batteries

A nickel-plated steel plate was used for a positive electrode case 1. A graphite coating film 2 was formed on the inner surface of the positive electrode case 1. A plurality of positive electrode material mixture pellets 3 in the shape of a short cylinder were inserted inside the positive electrode case 1. The positive electrode material mixture pellets 3 were re-pressurized inside the positive electrode case 1 so as to be closely attached onto the inner surface of the positive electrode case 1. A cylindrical separator 4 was inserted inside the positive electrode material mixture pellets 3, and an insulating cap 5 was placed on the inner bottom surface of the positive electrode case 1. Thereafter, an alkaline electrolyte was injected into the positive electrode case 1, in order to wet the separator 4 and the positive electrode material mixture pellets 3. An aqueous solution containing 40 wt % of potassium hydroxide was used as the alkaline electrolyte. After injection of the electrolyte, a gelled negative electrode 6 was filled inside the separator 4. A mixture of sodium polyacrylate serving as a gelling agent, the alkaline electrolyte and zinc powder serving as a negative electrode active material was used for the gelled negative electrode 6.

Next, a negative electrode current collector 10 integrally formed with a sealing plate 7 made of resin, a bottom plate 8 serving as a negative electrode terminal, and an insulating washer 9 was inserted into the gelled negative electrode 6. Then, the opening end of the positive electrode case 1 was clamped to the periphery of the bottom plate 8, with the end of the sealing plate 7 disposed therebetween, thus sealing the opening of the positive electrode case 1. The outer surface of the positive electrode case 1 was covered with an outer jacket label 11. Thus, an AA-sized nickel-manganese battery as shown in FIG. 1 was completed.

[5] Evaluation of Alkaline Batteries

Each of the thus fabricated nickel-manganese batteries A1 to D1 was continuously discharged at 20° C. with a constant current of 50 mA, and the discharge capacity obtained during a period in which the battery voltage reached 0.9 V was measured.

In addition, each of the batteries in the initial state was continuously discharged at 20° C. with a constant power of 1 W, and the discharge capacity obtained during a period in which the battery voltage reached 0.9 V was also measured.

The results obtained were shown together in Table 2. It should be noted that in both the 50 mA discharge and the 1 W discharge, the discharge capacity of each of the nickel-manganese batteries B1 to D1 was shown as a relative value, taking the discharge capacity of the nickel-manganese battery A1 as 100.

TABLE 2

| Type of battery | Nickel oxyhydroxide | 50 mA discharge capacity | 1 W discharge capacity |
|---|---|---|---|
| Battery A1 | Nickel oxyhydroxide A1 | 100 | 100 |
| Battery B1 | Nickel oxyhydroxide B1 | 120 | 98 |
| Battery C1 | Nickel oxyhydroxide C1 | 120 | 117 |
| Battery D1 | Nickel oxyhydroxide D1 | 121 | 116 |

From Table 2, the following can be stated:

First, in the case of the batteries using the nickel oxyhydroxides B1 to D1, in which manganese was dissolved to increase the average valence of nickel to about 3.4, a high capacity corresponding to the high valence was obtained when the batteries were continuously discharged with a constant current of 50 mA (low load). That is, the capacity of the batteries B1 to D1 could be increased to a higher level than that of the battery A1 using the nickel oxyhydroxide A1, which was composed mainly of the β-nickel oxyhydroxide.

However, for the continuous discharge with 1 W (heavy load), the capacity of the battery B1 using the nickel oxyhydroxide B1, in which only manganese was dissolved, was lower than that of the battery A1 using the nickel oxyhydroxide A1.

The reason seems to be that the heavy load discharge characteristics were greatly reduced, for example, due to the following reasons (controlling factors): (a) the redox potential (equilibrium potential) of the γ-nickel oxyhydroxide is lower than that of the β-nickel oxyhydroxide; (b) the γ-nickel oxyhydroxide undergoes a large volume change (change in the crystal structure) during discharge, and therefore has a high degree of polarization; and (c) the electron conductivity of the γ-nickel oxyhydroxide in which only manganese is dissolved greatly decreases with discharge.

In contrast, the battery C1 using the nickel oxyhydroxide C1, in which manganese and cobalt were dissolved, provided a high discharge capacity in both the 50 mA (low load) discharge and the 1 W (heavy load) discharge.

In this case, the discharge capacity seems to have been improved since the γ-type crystal structure was stabilized thermally due to the presence of the manganese ions (quadrivalent) added inside the nickel layers, thus increasing the average valence of nickel in the nickel oxyhydroxide.

Further, when cobalt is added in the nickel oxyhydroxide, a defect that is suitable for proton diffusion can be formed in the $NiO_2$ layers during the discharge process of nickel, and the electron conductivity of the nickel oxyhydroxide itself also improves at the same time. Accordingly, the electron conductivity of the nickel oxyhydroxide can also be maintained at a high level during discharge, so that the heavy load discharge characteristics are considered to be significantly improved.

It is inferred that the battery C1 using the solid solution nickel oxyhydroxide C1, in which both manganese and cobalt were dissolved, provided a high capacity both for the low load and heavy load discharges for these reasons.

In addition, the battery D1 whose surface was covered with a cobalt oxide and that used the nickel oxyhydroxide D1, in which manganese was dissolved, also provided a high discharge capacity in both the 50 mA (low load) discharge and the 1 W (heavy load) discharge.

In connection with this, another test was carried out, in which $Co(OH)_2$ that had been synthesized at a pH near 10 was introduced into a 5 mol/L sodium hydroxide, to which a sodium hypochlorite aqueous solution was added to convert the $Co(OH)_2$ into a cobalt oxide. Then, as a result of examining the average valence of cobalt in the resulting cobalt oxide, it was confirmed that the cobalt was oxidized to a valence greater than 3, and had very high electron conductivity.

The nickel oxyhydroxide D1 had a cobalt oxide having high electron conductivity attached onto the surface of the particles comprising the nickel oxyhydroxide, and therefore seems to have been able to maintain relatively favorable current collection between the active materials even during the discharge of the γ-nickel oxyhydroxide, which underwent a volume change. Accordingly, it seems that the degree of polarization was reduced, thus increasing the capacity and improving the heavy load discharge characteristics at the same time.

As described above, with the present invention, alkaline batteries having a high capacity and excellent heavy load discharge characteristics could be obtained.

Example 2

In order to optimize the average valence of nickel in the nickel oxyhydroxide, the value of $I_\gamma/(I_\gamma+I_\beta)$ and the content of the manganese dioxide in the positive electrode material mixture, the following tests and evaluations were performed.

[1] Production of Nickel Oxyhydroxide

After 200 g of the nickel hydroxide c1 [composition: $Ni_{0.90}Mn_{0.05}Co_{0.05}(OH)_2$] used in Example 1 was introduced into 1 L of a 0.5 mol/L sodium hydroxide aqueous solution, a sufficient amount of a sodium hypochlorite aqueous solution (effective chlorine concentration: 5 wt %) serving as an oxidizing agent was added thereto, and the whole was stirred to convert the nickel hydroxide to nickel oxyhydroxide. The resulting particles were sufficiently washed with water, followed by vacuum drying at 60° C. (24 hours), thereby producing a nickel oxyhydroxide $C_1$.

Further, nickel oxyhydroxides $C_2$ to $C_6$ were produced in the same manner as described above, except for changing the concentration of the sodium hydroxide aqueous solution to 1.0 mol/L, 3.0 mol/L, 4.0 mol/L, 5.0 mol/L and 7.0 mol/L, respectively.

[2] Analysis of Physical Properties of Nickel Oxyhydroxides

Table 3 summarizes the values of $I_\gamma/(I_\gamma+I_\beta)$ obtained by powder X-ray diffraction and the average valences of nickel obtained by a chemical analysis for the resulting nickel oxyhydroxides $C_1$ to $C_6$ From Table 3, it can be seen that the degree of oxidation of the nickel oxyhydroxide (the production ratio of the γ-nickel oxyhydroxide and the average valence of nickel) could be controlled by adjusting the concentration of the sodium hydroxide aqueous solution that was present at the time of the chemical oxidation.

TABLE 3

| Nickel oxyhydroxide | Concentration of NaOH aqueous solution | $I_\gamma/(I_\gamma+I_\beta)$ value | Average valence of nickel |
|---|---|---|---|
| Nickel oxyhydroxide $C_1$ | 0.5 M | 0.11 | 3.09 |
| Nickel oxyhydroxide $C_2$ | 1.0 M | 0.32 | 3.24 |
| Nickel oxyhydroxide $C_3$ | 3.0 M | 0.53 | 3.31 |
| Nickel oxyhydroxide $C_4$ | 4.0 M | 0.68 | 3.36 |
| Nickel oxyhydroxide $C_5$ | 5.0 M | 0.81 | 3.40 |
| Nickel oxyhydroxide $C_6$ | 7.0 M | 0.98 | 3.58 |

[3] Fabrication of Alkaline Batteries

Positive electrode material mixtures $C_{1n}$ to $C_{6n}$ (n is an integer of 1 to 8) were prepared using the nickel oxyhydroxides $C_1$ to $C_6$, and they were used to produce nickel-manganese batteries $C_{1n}$ to $C_{6n}$ (n is an integer of 1 to 8), respectively, serving as primary batteries.

Here, from the viewpoint of optimizing the content of the manganese dioxide in the positive electrode material mixture, the content of the manganese dioxide in the positive electrode material mixture (the weight ratio of manganese dioxide to the entire positive electrode material mixture, including, for example, graphite serving as a conductive agent) was varied as shown in Table 4.

For the positive electrode material mixture $C_{1n}$, 5 parts by weight of graphite (conductive agent) was added per 100 parts by weight of the total of the nickel oxyhydroxide $C_1$ and manganese dioxide, and zinc oxide was further added thereto in an amount corresponding to 5 wt % of the nickel oxyhydroxide $C_1$. Furthermore, 1 part by weight of the electrolyte was added per 100 parts by weight of the total of the nickel oxyhydroxide $C_1$ and manganese dioxide. Thereafter, the mixture was homogeneously stirred and mixed in a mixer, and then formed into particulates with a predetermined particle size. The resulting particulates were pressure-molded into a pellet in the shape of a short cylinder, thereby producing a positive electrode material mixture pellet. An AA-sized nickel-manganese battery $C_{1n}$ was fabricated in the same manner as in Example 1, except for using this positive electrode material mixture pellet.

AA-sized nickel-manganese batteries $C_{2n}$ to $C_{6n}$ were fabricated in a manner similar to that described above, using the nickel oxyhydroxides $C_2$ to $C_6$ in place of the nickel oxyhydroxide $C_1$. At this time, it was made sure that the amount of the positive electrode material mixture filled in the positive electrode case was the same for all the batteries.

TABLE 5

| Battery | Nickel oxyhydroxide | Content of manganese dioxide (wt %) | 50 mA discharge capacity | 1 W discharge capacity |
|---|---|---|---|---|
| Battery A1 | Nickel oxyhydroxide A | 50 | 100 | 100 |
| Battery $C_{11}$ | Nickel oxyhydroxide $C_1$ | 10 | 102 | 102 |
| Battery $C_{12}$ | Nickel oxyhydroxide $C_1$ | 20 | 105 | 102 |
| Battery $C_{13}$ | Nickel oxyhydroxide $C_1$ | 30 | 110 | 103 |
| Battery $C_{14}$ | Nickel oxyhydroxide $C_1$ | 40 | 111 | 103 |
| Battery $C_{15}$ | Nickel oxyhydroxide $C_1$ | 60 | 111 | 103 |
| Battery $C_{16}$ | Nickel oxyhydroxide $C_1$ | 80 | 112 | 102 |
| Battery $C_{17}$ | Nickel oxyhydroxide $C_1$ | 90 | 112 | 102 |
| Battery $C_{18}$ | Nickel oxyhydroxide $C_1$ | 95 | 112 | 101 |
| Battery $C_{21}$ | Nickel oxyhydroxide $C_2$ | 10 | 102 | 102 |
| Battery $C_{22}$ | Nickel oxyhydroxide $C_2$ | 20 | 107 | 105 |
| Battery $C_{23}$ | Nickel oxyhydroxide $C_2$ | 30 | 113 | 108 |
| Battery $C_{24}$ | Nickel oxyhydroxide $C_2$ | 40 | 112 | 108 |
| Battery $C_{25}$ | Nickel oxyhydroxide $C_2$ | 60 | 112 | 107 |

TABLE 4

| Content of manganese dioxide in positive electrode material mixture (wt %) | Nickel oxyhydroxide | | | | | |
|---|---|---|---|---|---|---|
| | $C_1$ | $C_2$ | $C_3$ | $C_4$ | $C_5$ | $C_6$ |
| 10 | Positive electrode material mixture $C_{11}$ | Positive electrode material mixture $C_{21}$ | Positive electrode material mixture $C_{31}$ | Positive electrode material mixture $C_{41}$ | Positive electrode material mixture $C_{51}$ | Positive electrode material mixture $C_{61}$ |
| 20 | Positive electrode material mixture $C_{12}$ | Positive electrode material mixture $C_{22}$ | Positive electrode material mixture $C_{32}$ | Positive electrode material mixture $C_{42}$ | Positive electrode material mixture $C_{52}$ | Positive electrode material mixture $C_{62}$ |
| 30 | Positive electrode material mixture $C_{13}$ | Positive electrode material mixture $C_{23}$ | Positive electrode material mixture $C_{33}$ | Positive electrode material mixture $C_{43}$ | Positive electrode material mixture $C_{53}$ | Positive electrode material mixture $C_{63}$ |
| 40 | Positive electrode material mixture $C_{14}$ | Positive electrode material mixture $C_{24}$ | Positive electrode material mixture $C_{34}$ | Positive electrode material mixture $C_{44}$ | Positive electrode material mixture $C_{54}$ | Positive electrode material mixture $C_{64}$ |
| 60 | Positive electrode material mixture $C_{15}$ | Positive electrode material mixture $C_{25}$ | Positive electrode material mixture $C_{35}$ | Positive electrode material mixture $C_{45}$ | Positive electrode material mixture $C_{55}$ | Positive electrode material mixture $C_{65}$ |
| 80 | Positive electrode material mixture $C_{16}$ | Positive electrode material mixture $C_{26}$ | Positive electrode material mixture $C_{36}$ | Positive electrode material mixture $C_{46}$ | Positive electrode material mixture $C_{56}$ | Positive electrode material mixture $C_{66}$ |
| 90 | Positive electrode material mixture $C_{17}$ | Positive electrode material mixture $C_{27}$ | Positive electrode material mixture $C_{37}$ | Positive electrode material mixture $C_{47}$ | Positive electrode material mixture $C_{57}$ | Positive electrode material mixture $C_{67}$ |
| 95 | Positive electrode material mixture $C_{18}$ | Positive electrode material mixture $C_{28}$ | Positive electrode material mixture $C_{38}$ | Positive electrode material mixture $C_{48}$ | Positive electrode material mixture $C_{58}$ | Positive electrode material mixture $C_{68}$ |

[4] Evaluation of Alkaline Batteries

Each of the thus fabricated 48 types of nickel-manganese batteries $C_{1n}$ to $C_{6n}$, and the battery A (using β-nickel oxyhydroxide), which was fabricated in Example 1, were continuously discharged at 20° C. with a constant current of 50 mA, and the discharge capacity obtained during a period in which the battery voltage reached 0.9 V was measured.

In addition, each of the batteries in the initial state was continuously discharged at 20° C. with a constant power of 1 W, and the discharge capacity obtained during a period in which the battery voltage reached 0.9 V was also measured.

The results obtained were summarized in Table 5. It should be noted that in both the 50 mA discharge and the 1 W discharge, the discharge capacity of each of the nickel-manganese batteries B to D was shown as a relative value, taking the discharge capacity of the nickel-manganese battery A as 100.

TABLE 5-continued

| Battery | Nickel oxyhydroxide | Content of manganese dioxide (wt %) | 50 mA discharge capacity | 1 W discharge capacity |
|---|---|---|---|---|
| Battery $C_{26}$ | Nickel oxyhydroxide $C_2$ | 80 | 113 | 106 |
| Battery $C_{27}$ | Nickel oxyhydroxide $C_2$ | 90 | 113 | 103 |
| Battery $C_{28}$ | Nickel oxyhydroxide $C_2$ | 95 | 114 | 102 |
| Battery $C_{31}$ | Nickel oxyhydroxide $C_3$ | 10 | 105 | 102 |
| Battery $C_{32}$ | Nickel oxyhydroxide $C_3$ | 20 | 111 | 111 |
| Battery $C_{33}$ | Nickel oxyhydroxide $C_3$ | 30 | 114 | 114 |
| Battery $C_{34}$ | Nickel oxyhydroxide $C_3$ | 40 | 114 | 115 |
| Battery $C_{35}$ | Nickel oxyhydroxide $C_3$ | 60 | 115 | 114 |
| Battery $C_{36}$ | Nickel oxyhydroxide $C_3$ | 80 | 114 | 113 |
| Battery $C_{37}$ | Nickel oxyhydroxide $C_3$ | 90 | 114 | 111 |
| Battery $C_{38}$ | Nickel oxyhydroxide $C_3$ | 95 | 115 | 103 |
| Battery $C_{41}$ | Nickel oxyhydroxide $C_4$ | 10 | 105 | 104 |
| Battery $C_{42}$ | Nickel oxyhydroxide $C_4$ | 20 | 111 | 111 |
| Battery $C_{43}$ | Nickel oxyhydroxide $C_4$ | 30 | 114 | 116 |
| Battery $C_{44}$ | Nickel oxyhydroxide $C_4$ | 40 | 116 | 117 |
| Battery $C_{45}$ | Nickel oxyhydroxide $C_4$ | 60 | 115 | 116 |

TABLE 5-continued

| Battery | Nickel oxyhydroxide | Content of manganese dioxide (wt %) | 50 mA discharge capacity | 1 W discharge capacity |
|---|---|---|---|---|
| Battery $C_{46}$ | Nickel oxyhydroxide $C_4$ | 80 | 116 | 115 |
| Battery $C_{47}$ | Nickel oxyhydroxide $C_4$ | 90 | 116 | 111 |
| Battery $C_{48}$ | Nickel oxyhydroxide $C_4$ | 95 | 117 | 103 |
| Battery $C_{51}$ | Nickel oxyhydroxide $C_5$ | 10 | 104 | 104 |
| Battery $C_{52}$ | Nickel oxyhydroxide $C_5$ | 20 | 112 | 112 |
| Battery $C_{53}$ | Nickel oxyhydroxide $C_5$ | 30 | 115 | 116 |
| Battery $C_{54}$ | Nickel oxyhydroxide $C_5$ | 40 | 120 | 119 |
| Battery $C_{55}$ | Nickel oxyhydroxide $C_5$ | 60 | 119 | 118 |
| Battery $C_{56}$ | Nickel oxyhydroxide $C_5$ | 80 | 120 | 115 |
| Battery $C_{57}$ | Nickel oxyhydroxide $C_5$ | 90 | 120 | 112 |
| Battery $C_{58}$ | Nickel oxyhydroxide $C_5$ | 95 | 119 | 103 |
| Battery $C_{61}$ | Nickel oxyhydroxide $C_6$ | 10 | 108 | 105 |
| Battery $C_{62}$ | Nickel oxyhydroxide $C_6$ | 20 | 115 | 110 |
| Battery $C_{63}$ | Nickel oxyhydroxide $C_6$ | 30 | 124 | 115 |
| Battery $C_{64}$ | Nickel oxyhydroxide $C_6$ | 40 | 124 | 117 |
| Battery $C_{65}$ | Nickel oxyhydroxide $C_6$ | 60 | 123 | 116 |
| Battery $C_{66}$ | Nickel oxyhydroxide $C_6$ | 80 | 124 | 114 |
| Battery $C_{67}$ | Nickel oxyhydroxide $C_6$ | 90 | 124 | 110 |
| Battery $C_{68}$ | Nickel oxyhydroxide $C_6$ | 95 | 120 | 104 |

From Table 5, the following can be stated:

First, in the cases of the alkaline batteries $C_{11}$ to $C_{68}$, which used nickel oxyhydroxide in which manganese and cobalt were dissolved, the average valence of nickel was increased by the presence of manganese, and moreover, the electron conductivity was improved by the presence of cobalt. Accordingly, each of the batteries $C_{11}$ to $C_{68}$ provided enhanced characteristics, as compared with those of the battery A1, which used β-nickel oxyhydroxide.

In particular, the batteries $C_{32}$ to $C_{37}$, $C_{42}$ to $C_{47}$, $C_{52}$ to $C_{57}$ and $C_{62}$ to $C_{67}$, which used nickel oxyhydroxides ($C_3$ to $C_6$) having a value of $I_\gamma/(I_\gamma+I_\beta)$ of not less than 0.5 and an average valence of nickel of not less than 3.3 and in which the content of the manganese dioxide in the positive electrode material mixture was 20 to 90 wt %, had exhibited a significant improvement in the 1 W (heavy load) discharge as compared with the battery A, and provided characteristics as high as 110 or above in Table 5.

The reason that the above-described results were obtained seems to be as follows:

First, when the contents of manganese dioxide are the same, the higher the production ratio of the γ-type crystal structure [$I_\gamma/(I_\gamma+I_\beta)$ value] or the average valence of nickel in the nickel oxyhydroxide (i.e., in the order from $C_1$ to $C_6$), the higher the capacity becomes, since the multiple-electron reaction of nickel can be utilized for discharge.

On the other hand, manganese dioxide has a large capacity, but has poor in electron conductivity and hence low efficiency during discharge under heavy load, and therefore, the 1 W characteristics start to decrease when the content of manganese dioxide exceeds 90 wt %.

Further, it is inferred that when the content of manganese dioxide is as extremely low as 10 wt %, it becomes difficult to establish a successful connection between the active materials with graphite due to a decrease in moldability of the positive electrode material mixture pellet, thus also decreasing the 1 W characteristics.

It seems that, for the reasons as described above, the batteries that used particles comprising nickel oxyhydroxide with a value of $I_\gamma/(I_\gamma+I_\beta)$ of not less than 0.5 and an average valence of nickel of not less than 3.3 and in which the content of the manganese dioxide in the positive electrode material mixture was 20 to 90 wt % provided particularly excellent characteristics.

In addition, although not described in details here, characteristics that were generally higher than those of the battery A1 using β-nickel oxyhydroxide could also be achieved when using the nickel oxyhydroxide D1, which was used in Example 1. Particularly, another test confirmed a significant improvement in the performance, mainly the heavy load characteristics, of the alkaline batteries could be achieve when the particles comprising nickel oxyhydroxide with a value of $I_\gamma/(I_\gamma+I_\beta)$ of not less than 0.5 and an average valence of nickel of not less than 3.3 were coated with a cobalt oxide and the content of the manganese dioxide in the positive electrode material mixture was 20 to 90 wt %.

Example 3

In order to optimize the amounts of manganese and cobalt dissolved in the particles comprising nickel oxyhydroxide, the following tests and evaluations were performed.

[1] Production of Particles Comprising Nickel Hydroxide

Pure water and a small amount of hydrazine (reducing agent) were added into a reaction vessel provided with a stirring blade, and bubbling with a nitrogen gas was started. Additionally, a nickel (II) sulfate aqueous solution, a manganese (II) sulfate aqueous solution, a cobalt (II) sulfate aqueous solution, a sodium hydroxide aqueous solution and ammonia water having predetermined concentrations were prepared. They were supplied with pumps into the above-described reaction vessel such that the pH in the vessel was constant, and continuous stirring was performed sufficiently, thereby precipitating and growing a solid solution comprising spherical β-nickel hydroxide in which manganese and cobalt were dissolved.

Subsequently, the resulting particles were heated in a sodium hydroxide aqueous solution that was different from the one described above to remove sulfate ions, followed by washing with water and vacuum drying, and they were further subjected to air oxidation at 80° C. for 72 hours, thereby producing a nickel hydroxide aa [composition: $Ni_{0.99}Mn_{0.005}Co_{0.005}(OH)_2$]. Here, the air oxidation was a treatment for oxidizing only Mn to a valence near 4.

Further, nickel hydroxides ab to ay having the compositions as shown in Table 6 were synthesized in the same manner as described above, except for varying the ratios of the manganese (II) sulfate aqueous solution and the cobalt (II) sulfate aqueous solution that were supplied into the reaction vessel.

[2] Oxidation of Nickel Hydroxide to Nickel Oxyhydroxide

After 200 g of the nickel hydroxide aa was introduced into 1 L of a 5 mol/L sodium hydroxide aqueous solution, a sufficient amount of a sodium hypochlorite aqueous solution (effective chlorine concentration: 5 wt %) serving as an oxidizing agent was added thereto, and the whole was stirred to convert the nickel hydroxide to nickel oxyhydroxide. The resulting particles were sufficiently washed with water, followed by vacuum drying at 60° C. (24 hours), thereby producing a nickel oxyhydroxide AA.

Additionally, nickel oxyhydroxides AB to AY were producted by performing a process similar to that described above, using the nickel hydroxides ab to ay, respectively, in place of the nickel hydroxide aa.

[3] Analysis of Physical Properties of Nickel Oxyhydroxides

Table 6 summarizes the values of $I_\gamma/(I_\gamma+I_\beta)$ obtained by powder X-ray diffraction and the average valence of nickel obtained by a chemical analysis for the resulting 25 different nickel oxyhydroxides $C_1$ to $C_6$.

From Table 6, it can be seen that in the case of the nickel oxyhydroxides AA to AE, in which the amount of manganese dissolved was as extremely low as 0.5 mol % ($Mn_{0.005}$), the production ratio of the γ-type crystal structure and the average valence of nickel were lower than those of the rest.

TABLE 6

| Nickel oxyhydroxide | Nickel hydroxide source material | $I_\gamma/(I_\gamma+I_\beta)$ value | Average valence of nickel |
|---|---|---|---|
| Nickel oxyhydroxide AA | Nickel hydroxide aa: $Ni_{0.99}Mn_{0.005}Co_{0.005}(OH)_2$ | 0.23 | 3.15 |
| Nickel oxyhydroxide AB | Nickel hydroxide ab: $Ni_{0.985}Mn_{0.005}Co_{0.01}(OH)_2$ | 0.24 | 3.16 |
| Nickel oxyhydroxide AC | Nickel hydroxide ac: $Ni_{0.945}Mn_{0.005}Co_{0.05}(OH)_2$ | 0.25 | 3.18 |
| Nickel oxyhydroxide AD | Nickel hydroxide ad: $Ni_{0.925}Mn_{0.005}Co_{0.07}(OH)_2$ | 0.28 | 3.18 |
| Nickel oxyhydroxide AE | Nickel hydroxide ae: $Ni_{0.895}Mn_{0.005}Co_{0.10}(OH)_2$ | 0.29 | 3.19 |
| Nickel oxyhydroxide AF | Nickel hydroxide af: $Ni_{0.985}Mn_{0.01}Co_{0.005}(OH)_2$ | 0.53 | 3.32 |
| Nickel oxyhydroxide AG | Nickel hydroxide ag: $Ni_{0.98}Mn_{0.01}Co_{0.01}(OH)_2$ | 0.55 | 3.34 |
| Nickel oxyhydroxide AH | Nickel hydroxide ah: $Ni_{0.94}Mn_{0.01}Co_{0.05}(OH)_2$ | 0.56 | 3.35 |
| Nickel oxyhydroxide AI | Nickel hydroxide ai: $Ni_{0.92}Mn_{0.01}Co_{0.07}(OH)_2$ | 0.55 | 3.35 |
| Nickel oxyhydroxide AJ | Nickel hydroxide aj: $Ni_{0.89}Mn_{0.01}Co_{0.10}(OH)_2$ | 0.57 | 3.34 |
| Nickel oxyhydroxide AK | Nickel hydroxide ak: $Ni_{0.945}Mn_{0.05}Co_{0.005}(OH)_2$ | 0.80 | 3.40 |
| Nickel oxyhydroxide AL | Nickel hydroxide al: $Ni_{0.94}Mn_{0.05}Co_{0.01}(OH)_2$ | 0.80 | 3.39 |
| Nickel oxyhydroxide AM | Nickel hydroxide am: $Ni_{0.90}Mn_{0.05}Co_{0.05}(OH)_2$ | 0.81 | 3.40 |
| Nickel oxyhydroxide AN | Nickel hydroxide an: $Ni_{0.88}Mn_{0.05}Co_{0.07}(OH)_2$ | 0.82 | 3.40 |
| Nickel oxyhydroxide AO | Nickel hydroxide ao: $Ni_{0.85}Mn_{0.05}Co_{0.10}(OH)_2$ | 0.81 | 3.41 |
| Nickel oxyhydroxide AP | Nickel hydroxide ap: $Ni_{0.925}Mn_{0.07}Co_{0.005}(OH)_2$ | 0.84 | 3.44 |
| Nickel oxyhydroxide AQ | Nickel hydroxide aq: $Ni_{0.92}Mn_{0.07}Co_{0.01}(OH)_2$ | 0.86 | 3.46 |
| Nickel oxyhydroxide AR | Nickel hydroxide ar: $Ni_{0.88}Mn_{0.07}Co_{0.05}(OH)_2$ | 0.85 | 3.45 |
| Nickel oxyhydroxide AS | Nickel hydroxide as: $Ni_{0.86}Mn_{0.07}Co_{0.07}(OH)_2$ | 0.85 | 3.45 |
| Nickel oxyhydroxide AT | Nickel hydroxide at: $Ni_{0.83}Mn_{0.07}Co_{0.10}(OH)_2$ | 0.86 | 3.46 |
| Nickel oxyhydroxide AU | Nickel hydroxide au: $Ni_{0.895}Mn_{0.10}Co_{0.005}(OH)_2$ | 0.91 | 3.50 |
| Nickel oxyhydroxide AV | Nickel hydroxide av: $Ni_{0.89}Mn_{0.10}Co_{0.01}(OH)_2$ | 0.92 | 3.51 |
| Nickel oxyhydroxide AW | Nickel hydroxide aw: $Ni_{0.85}Mn_{0.10}Co_{0.05}(OH)_2$ | 0.92 | 3.50 |
| Nickel oxyhydroxide AX | Nickel hydroxide ax: $Ni_{0.83}Mn_{0.10}Co_{0.07}(OH)_2$ | 0.91 | 3.51 |
| Nickel oxyhydroxide AY | Nickel hydroxide ay: $Ni_{0.80}Mn_{0.10}Co_{0.10}(OH)_2$ | 0.93 | 3.52 |

[4] Fabrication of Alkaline Batteries

Nickel-manganese batteries AA to AY serving as primary batteries were produced, using the nickel oxyhydroxides AA to AY, respectively.

For the nickel-manganese battery AA, the nickel oxyhydroxide AA, manganese dioxide and graphite were mixed at a weight ratio of 50:50:5, and zinc oxide was further added to this mixture in an amount corresponding to 5 wt % of the nickel oxyhydroxide AA. Furthermore, 1 part by weight of the electrolyte was added per 100 parts by weight of the total of the nickel oxyhydroxide AA and manganese dioxide. Thereafter, the mixture was homogeneously stirred and mixed in a mixer, and then formed into particulates with a predetermined particle size. The resulting particulates were pressure-molded into a pellet in the shape of a short cylinder, thereby producing a positive electrode material mixture pellet. An AA-sized alkaline battery AA was fabricated in the same manner as in Example 1, except for using this positive electrode material mixture pellet.

AA-sized nickel-manganese batteries AB to AY were fabricated in a manner similar to that described above, using the nickel oxyhydroxides AB to AY in place of the nickel oxyhydroxide AA. At this time, it was made sure that the amount of the positive electrode material mixture filled in the positive electrode case was the same for all the batteries.

[5] Evaluation of Alkaline Batteries

Each of the thus fabricated 25 types of nickel-manganese batteries AB to AY and the battery A (using β-nickel oxyhydroxide), which was fabricated in Example 1, were continuously discharged at 20° C. with a constant current of 50 mA, and the discharge capacity obtained during a period in which the battery voltage reached 0.9 V was measured.

In addition, each of the batteries in the initial state was continuously discharged at 20° C. with a constant power of 1 W, and the discharge capacity obtained during a period in which the battery voltage reached 0.9 V was also measured.

The results obtained were summarized in Table 7. It should be noted that in both the 50 mA discharge and the 1 W discharge, the discharge capacity of each of the nickel-manganese batteries AA to AY was shown as a relative value, taking the discharge capacity of the nickel-manganese battery A as 100.

TABLE 7

| Battery | Nickel oxyhydroxide | | 50 mA discharge capacity | 1 W discharge capacity |
|---|---|---|---|---|
| Battery A1 | Nickel oxyhydroxide A | Nickel hydroxide a: $Ni(OH)$ | 100 | 100 |
| Battery AA | Nickel oxyhydroxide AA | Nickel hydroxide aa: $Ni_{0.99}Mn_{0.005}Co_{0.005}(OH)_2$ | 111 | 106 |
| Battery AB | Nickel oxyhydroxide AB | Nickel hydroxide ab: $Ni_{0.985}Mn_{0.005}Co_{0.01}(OH)_2$ | 112 | 107 |

TABLE 7-continued

| Battery | Nickel oxyhydroxide | | 50 mA discharge capacity | 1 W discharge capacity |
|---|---|---|---|---|
| Battery AC | Nickel oxyhydroxide AC | Nickel hydroxide ac: $Ni_{0.945}Mn_{0.005}Co_{0.05}(OH)_2$ | 112 | 108 |
| Battery AD | Nickel oxyhydroxide AD | Nickel hydroxide ad: $Ni_{0.925}Mn_{0.005}Co_{0.07}(OH)_2$ | 112 | 108 |
| Battery AE | Nickel oxyhydroxide AE | Nickel hydroxide ae: $Ni_{0.895}Mn_{0.005}Co_{0.10}(OH)_2$ | 112 | 109 |
| Battery AF | Nickel oxyhydroxide AF | Nickel hydroxide af: $Ni_{0.985}Mn_{0.01}Co_{0.005}(OH)_2$ | 115 | 107 |
| Battery AG | Nickel oxyhydroxide AG | Nickel hydroxide ag: $Ni_{0.98}Mn_{0.01}Co_{0.01}(OH)_2$ | 115 | 112 |
| Battery AH | Nickel oxyhydroxide AH | Nickel hydroxide ah: $Ni_{0.94}Mn_{0.01}Co_{0.05}(OH)_2$ | 116 | 113 |
| Battery AI | Nickel oxyhydroxide AI | Nickel hydroxide ai: $Ni_{0.92}Mn_{0.01}Co_{0.07}(OH)_2$ | 115 | 112 |
| Battery AJ | Nickel oxyhydroxide AJ | Nickel hydroxide aj: $Ni_{0.89}Mn_{0.01}Co_{0.10}(OH)_2$ | 113 | 107 |
| Battery AK | Nickel oxyhydroxide AK | Nickel hydroxide ak: $Ni_{0.945}Mn_{0.05}Co_{0.005}(OH)_2$ | 119 | 106 |
| Battery AL | Nickel oxyhydroxide AL | Nickel hydroxide al: $Ni_{0.94}Mn_{0.05}Co_{0.01}(OH)_2$ | 120 | 113 |
| Battery AM | Nickel oxyhydroxide AM | Nickel hydroxide am: $Ni_{0.90}Mn_{0.05}Co_{0.05}(OH)_2$ | 120 | 117 |
| Battery AN | Nickel oxyhydroxide AN | Nickel hydroxide an: $Ni_{0.88}Mn_{0.05}Co_{0.07}(OH)_2$ | 119 | 114 |
| Battery AO | Nickel oxyhydroxide AO | Nickel hydroxide ao: $Ni_{0.85}Mn_{0.05}Co_{0.10}(OH)_2$ | 115 | 108 |
| Battery AP | Nickel oxyhydroxide AP | Nickel hydroxide ap: $Ni_{0.925}Mn_{0.07}Co_{0.005}(OH)_2$ | 120 | 106 |
| Battery AQ | Nickel oxyhydroxide AQ | Nickel hydroxide aq: $Ni_{0.92}Mn_{0.07}Co_{0.01}(OH)_2$ | 120 | 113 |
| Battery AR | Nickel oxyhydroxide AR | Nickel hydroxide ar: $Ni_{0.88}Mn_{0.07}Co_{0.05}(OH)_2$ | 121 | 116 |
| Battery AS | Nickel oxyhydroxide AS | Nickel hydroxide as: $Ni_{0.86}Mn_{0.07}Co_{0.07}(OH)_2$ | 120 | 114 |
| Battery AT | Nickel oxyhydroxide AT | Nickel hydroxide at: $Ni_{0.83}Mn_{0.07}Co_{0.10}(OH)_2$ | 115 | 109 |
| Battery AU | Nickel oxyhydroxide AU | Nickel hydroxide au: $Ni_{0.895}Mn_{0.10}Co_{0.005}(OH)_2$ | 116 | 102 |
| Battery AV | Nickel oxyhydroxide AV | Nickel hydroxide av: $Ni_{0.89}Mn_{0.10}Co_{0.01}(OH)_2$ | 115 | 106 |
| Battery AW | Nickel oxyhydroxide AW | Nickel hydroxide aw: $Ni_{0.85}Mn_{0.10}Co_{0.05}(OH)_2$ | 114 | 108 |
| Battery AX | Nickel oxyhydroxide AX | Nickel hydroxide ax: $Ni_{0.83}Mn_{0.10}Co_{0.07}(OH)_2$ | 113 | 107 |
| Battery AY | Nickel oxyhydroxide AY | Nickel hydroxide ay: $Ni_{0.80}Mn_{0.10}Co_{0.10}(OH)_2$ | 111 | 103 |

From Table 7, the following can be stated.

First, in the cases of the alkaline batteries AA to AY, which used nickel oxyhydroxide in which manganese and cobalt were dissolved, the average valence of nickel was increased by the presence of manganese, and moreover, the electron conductivity was improved by the presence of cobalt. Accordingly, each of the batteries AA to AY provided enhanced characteristics, as compared with the battery A1, which used β-nickel oxyhydroxide.

In particular, the cases in which the amounts of manganese and cobalt dissolved in the nickel oxyhydroxide were 1 to 7 mol % of the total of the metallic elements included in the particles comprising the nickel oxyhydroxide, that is, the batteries using the nickel oxyhydroxides AG to AI, AL to AN and AQ to AS exhibited a significant capacity increase in both the 50 mA (low load) discharge and the 1 W (heavy load) discharge, and provided characteristics as high as 110 or above in Table 7.

As is evident from the results in Table 6, the batteries AA to AE, in which the amount of manganese dissolved in the nickel oxyhydroxide was less than 1 mol %, could not provide nickel oxyhydroxide having a high degree of oxidation, and thus exhibited a relatively small capacity increase. On the other hand, the batteries AU to AY, in which the amount of manganese dissolved in the nickel oxyhydroxide was greater than 7 mol %, had a relatively small content of nickel in the nickel oxyhydroxides, and was affected by reduced electron conductivity, which is typical of a solid solution containing manganese, during the heavy load discharge, so that they tended to decrease in capacity.

Furthermore, the batteries AA, AF, AK, AP and AU, in which the amount of cobalt dissolved in the nickel oxyhydroxide was less than 1 mol %, showed a relatively small effect of the addition of cobalt on improving the electron conductivity and the proton diffusion. On the other hand, the batteries AE, AJ, AO, AT and AY, in which the amount of cobalt dissolved in the nickel oxyhydroxide was greater than 7 mol %, had a relatively small content of nickel in the nickel oxyhydroxide, and therefore had a relatively small capacity increase.

Thus, from the viewpoint of increasing the capacity, it is particularly preferable in the present invention that the amount of each of manganese and cobalt dissolved in particles comprising nickel oxyhydroxide or nickel hydroxide serving as a source material thereof is 1 to 7 mol % of the total of the metallic elements included in the particles.

Example 4

In order to optimize the amount of cobalt oxide attached onto the surface of the particles comprising nickel oxyhydroxide, the following tests and evaluations were performed.

[1] Production of Particles Comprising Nickel Oxyhydroxide

After the nickel hydroxide b1 [composition: $Ni_{0.95}Mn_{0.05}(OH)_2$], used in Example 1, was introduced into a cobalt sulfate aqueous solution in a reaction vessel, a sodium hydroxide aqueous solution was gradually added thereto, and the whole was continuously stirred at 35° C. while adjusting the pH in the vessel such that it was maintained at 10, thus precipitating cobalt hydroxide on the surface of the solid solution particles.

At this time, the amount of cobalt hydroxide attached onto the surface of the nickel hydroxide b was varied in the range from 0.05 to 9 parts by weight per 100 parts by weight of the nickel hydroxide b1 (0.05 to 9 wt % relative to the nickel hydroxide b) by appropriately adjusting the concentration of the cobalt sulfate aqueous solution. Thus, seven types of nickel hydroxides e1 to k1 as shown in Table 8, which were coated with $Co(OH)_2$, were produced. The nickel hydroxides e1 to k1 were washed with water, and thereafter vacuum dried.

[2] Oxidation of Nickel Hydroxide to Nickel Oxyhydroxide

After 200 g of the nickel hydroxide e1 was introduced into 1 L of a 5 mol/L sodium hydroxide aqueous solution, a sufficient amount of a sodium hypochlorite aqueous solution (effective chlorine concentration: 5 wt %) serving as an oxidizing agent was added thereto, and the whole was stirred to convert the nickel hydroxide to nickel oxyhydroxide, while oxidizing $Co(OH)_2$. The resulting particles were sufficiently washed with water, followed by vacuum drying at 60° C. (24 hours), thereby producing a nickel oxyhydroxide E1.

Additionally, nickel oxyhydroxides F1 to K1 were produced by performing a process similar to that described above, using the nickel hydroxides f1 to k1, respectively, in place of the nickel hydroxide e1.

TABLE 8

| $Co(OH)_2$-coated Nickel hydroxide | Amount of $Co(OH)_2$ (wt %) |
|---|---|
| Nickel hydroxide e1 | 0.05 |
| Nickel hydroxide f1 | 0.1 |
| Nickel hydroxide g1 | 1 |
| Nickel hydroxide h1 | 3 |
| Nickel hydroxide I1 | 5 |
| Nickel hydroxide j1 | 7 |
| Nickel hydroxide k1 | 9 |

[3] Fabrication of Alkaline Batteries

Nickel-manganese batteries E1 to K1 serving as primary batteries were produced, using the nickel oxyhydroxides E1 to K1, respectively.

For the nickel-manganese battery E1, the nickel oxyhydroxide E1, manganese dioxide and graphite were mixed at a weight ratio of 50:50:5, and zinc oxide was further added to this mixture in an amount corresponding to 5 wt % of the nickel oxyhydroxide E1. Furthermore, 1 part by weight of the alkaline electrolyte was added per 100 parts by weight of the total of the nickel oxyhydroxide E1 and manganese dioxide. Thereafter, the mixture was homogeneously stirred and mixed in a mixer, and then formed into particulates with a predetermined particle size. The resulting particulates were molded into a pellet in the shape of a short cylinder, thereby producing a positive electrode material mixture pellet. An AA-sized alkaline battery E1 was fabricated in the same manner as in Example 1, except for using this positive electrode material mixture pellet.

Further, AA-sized nickel-manganese batteries F1 to K1 were fabricated in a manner similar to that described above, using the nickel oxyhydroxides F1 to K1 in place of the nickel oxyhydroxide E1. At this time, it was made sure that the amount of the positive electrode material mixture filled in the positive electrode case was the same for all the batteries.

[4] Evaluation of Alkaline Batteries

Each of the thus fabricated 7 types of nickel-manganese batteries E1 to K1, and the battery A1 (using β-nickel oxyhydroxide) fabricated in Example 1, were continuously discharged at 20° C. with a constant current of 50 mA, and the discharge capacity obtained during a period in which the battery voltage reached 0.9 V was measured.

In addition, each of the batteries in the initial state was continuously discharged at 20° C. with a constant power of 1 W, and the discharge capacity obtained during a period in which the battery voltage reached 0.9 V was also measured.

Here, each of the batteries that had undergone the 1 W discharge was further stored at 60° C. for seven days, and then the amount of gas generated inside the battery was measured.

The results obtained were summarized in Table 9. It should be noted that in both the 50 mA discharge and the 1 W discharge, the discharge capacity of each of the nickel-manganese batteries E1 to K1 and the amount of gas generated inside each of the batteries E1 to K1 after discharge were shown as relative values, taking the discharge capacity of and the amount of gas generated in the nickel-manganese battery A1 as 100.

TABLE 9

| Battery | Nickel oxyhydroxide | Element contained in solid solution | Amount of Co oxide (wt %) | 50 mA discharge capacity | 1 W discharge capacity | Amount of gas generated during storage |
|---|---|---|---|---|---|---|
| Battery A1 | Nickel oxyhydroxide A1 | — | 0 | 100 | 100 | 100 |
| Battery E1 | Nickel oxyhydroxide E1 | Mn 5 mol % | 0.05 | 119 | 105 | 100 |
| Battery F1 | Nickel oxyhydroxide F1 | Mn 5 mol % | 0.1 | 120 | 111 | 100 |

TABLE 9-continued

| Battery | Nickel oxyhydroxide | Element contained in solid solution | Amount of Co oxide (wt %) | 50 mA discharge capacity | 1 W discharge capacity | Amount of gas generated during storage |
|---|---|---|---|---|---|---|
| Battery G1 | Nickel oxyhydroxide G1 | Mn 5 mol % | 1 | 120 | 114 | 101 |
| Battery H1 | Nickel oxyhydroxide H1 | Mn 5 mol % | 3 | 121 | 115 | 101 |
| Battery I1 | Nickel oxyhydroxide I1 | Mn 5 mol % | 5 | 121 | 116 | 102 |
| Battery J1 | Nickel oxyhydroxide J1 | Mn 5 mol % | 7 | 120 | 113 | 103 |
| Battery K1 | Nickel oxyhydroxide K1 | Mn 5 mol % | 9 | 118 | 109 | 111 |

From Table 9, the following can be stated.

First, in the cases of the alkaline batteries E1 to K1, which used particles comprising nickel oxyhydroxide and having a cobalt oxide attached onto its surface, the average valence of nickel was increased by the presence of manganese dissolved in the particles comprising the nickel oxyhydroxide, and moreover, the electrical connection between the active materials was improved by the cobalt oxide. Accordingly, each of the batteries E1 to K1 provided enhanced characteristics, as compared with the battery A1, which used particles comprising β-nickel oxyhydroxide.

In particular, the batteries F1 to J1, in which the weight percentage of the cobalt oxide relative to the particles comprising the nickel oxyhydroxide was 0.1 to 7 wt %, achieved a high discharge capacity both in the 50 mA (low load) discharge and the 1 W (heavy load) discharge, and provided characteristics as high as 110 or above in Table 9. Furthermore, the amount of gas generated during storage was suppressed to the same level as that of the battery A.

The battery E1 using the nickel oxyhydroxide E1, in which the weight percentage of the cobalt oxide was less than 0.1 wt %, had an excessively small amount of the cobalt oxide, and therefore had not yet achieved a significant improving effect for the heavy load discharge characteristics.

The battery K using the nickel oxyhydroxide K1, in which the weight percentage of the cobalt oxide was greater than 7 wt %, could maintain relatively favorable discharge characteristics, but had an increased amount of gas generated when the discharged battery was stored at 60° C. for seven days. The reason for this seems to be that the battery K1 had an excessive amount of the cobalt oxide in the positive electrode, so that the cobalt oxide in the positive electrode was reduced to a valence of 2 and dissolved into the electrolyte, when the discharged battery was stood still (stored). It is inferred that the cobalt ions then precipitated as metallic cobalt on the zinc particles of the negative electrode, thus accelerating the hydrogen generation reaction in the negative electrode.

As described above, in the case of coating the surface of particles comprising nickel oxyhydroxide with a cobalt oxide, it is preferable that the amount of the cobalt oxide is 0.1 to 7 wt % of the particles comprising the nickel oxyhydroxide, from the viewpoint of securing a suitable balance between the discharge characteristics and the storage characteristics (reliability).

Here, in this example, a solid solution nickel hydroxide [$Ni_{0.95}Mn_{0.05}(OH)_2$] containing 5 mol % of Mn was used as the source material for particles comprising nickel oxyhydroxide. However, in view of the results of Example 3, for example, it is inferred that similar battery characteristics can be obtained when the amount of dissolved Mn contained in the solid solution was in the range of 1 to 7 mol %.

Example 5

[1] Production of Nickel Hydroxide

A nickel (II) sulfate aqueous solution, a sodium hydroxide aqueous solution and ammonia water having predetermined concentrations were prepared, and they were supplied with pumps into a reaction vessel provided with a stirring blade such that the pH in the vessel was constant, and continuous stirring was performed sufficiently, thereby precipitating and growing spherical β-nickel hydroxide.

Subsequently, the resulting particles were heated in a sodium hydroxide aqueous solution that was different from the one described above to remove sulfate ions, followed by washing with water and drying, thereby producing a nickel hydroxide powder. The average particle diameter on a volume basis of the resulting nickel hydroxide powder measured by a laser diffraction particle size distribution analyzer was 10 μm, and the BET specific surface area was 9.0 $m^2/g$, and the tap density was 2.20 $g/cm^3$.

[2] Oxidation of Nickel Hydroxide to Nickel Oxyhydroxide

Next, as the oxidation treatment for the nickel hydroxide powder, two treatments, namely, a chemical oxidation treatment using an oxidizing agent and an overoxidation treatment (overcharge treatment) using an electrochemical reaction were investigated.

(1) Chemical Oxidation Treatment Using Oxidizing Agent

<1> Nickel Oxyhydroxide a2

After 200 g of the nickel hydroxide powder was introduced into 1 L of a 0.5 mol/L sodium hydroxide aqueous solution, a sufficient amount of a sodium hypochlorite aqueous solution (effective chlorine concentration: 5 wt %) serving as an oxidizing agent was added thereto, and the whole was stirred to convert the nickel hydroxide into nickel oxyhydroxide. The resulting particles were sufficiently washed with water, followed by vacuum drying at 60° C. (24 hours), thereby producing a nickel oxyhydroxide a2.

<2> Nickel Oxyhydroxide b2

A nickel oxyhydroxide b2 was produced by performing the same chemical oxidation treatment as described in <1> above, except for using a sodium hydroxide aqueous solution having a high concentration of 7 mol/L in place of the 0.5 mol/L sodium hydroxide aqueous solution.

(2) Overoxidation Treatment Using Electrochemical Reaction

<1> Nickel Oxyhydroxide c2

A suitable amount of pure water was added to the nickel oxyhydroxide a2 to form a paste, and a predetermined amount of this was filled in a foamed nickel substrate having a porosity of 95%. Subsequently, the nickel substrate in which the paste was filled was dried in a dryer at 80° C., then rolled with a roll press, and a nickel lead for current collection was attached onto the nickel substrate, thus forming a nickel positive electrode. An open-type cell was fabricated using this nickel positive electrode, a cadmium oxide negative electrode having a sufficiently large capacity, a nonwoven fabric separator made of polypropylene that had been subjected to a hydrophilization treatment and a 7 mol/L sodium hydroxide aqueous solution.

In the open-type cell, an overcharge (overoxidation) treatment was performed on the positive electrode. At this time, the electrical capacity obtained assuming that the nickel oxyhydroxide a2 filled in the positive electrode underwent one-electron reaction was taken as the cell capacity (1 It), and overcharge was performed at a charge rate of 0.1 It for three hours. After the overcharge, the nickel positive electrode was collected, and then subjected to ultrasonic cleaning to collect the nickel oxyhydroxide, which was then washed with water. Thereafter, vacuum drying was performed at 60° C. (24 hours), thereby obtaining a nickel oxyhydroxide c2 that had been subjected to a overcharge treatment.

<2> Nickel Oxyhydroxides d2, e2, f2

Nickel oxyhydroxide d2, e2 and f2 were obtained by performing the same overcharge treatment as described in <1> above, except that charging was carried out at a charge rate of 0.1 It for 6 hours, 9 hours and 12 hours, respectively.

[3] Analysis of Physical Properties of Nickel Oxyhydroxides

Figure 2:
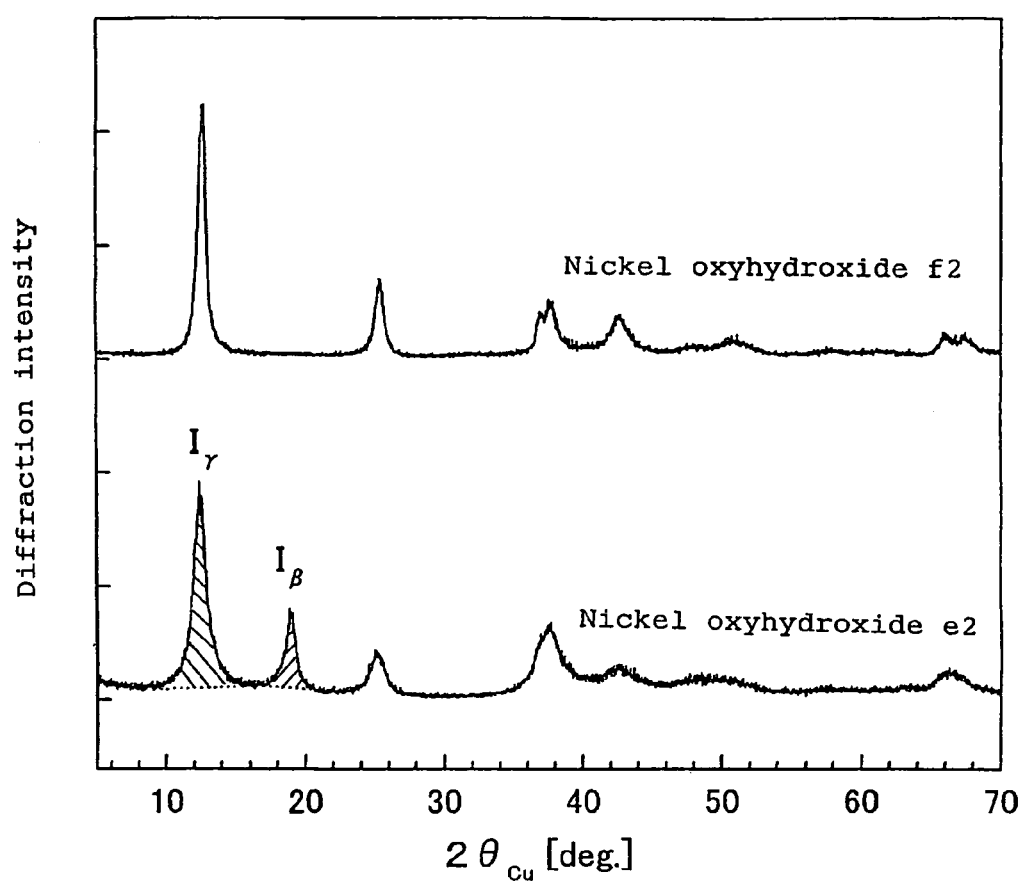
FIG. 2 shows powder X-ray diffraction patterns of nickel oxyhydroxides according to the present invention.

First, powder X-ray diffraction was performed on the nickel oxyhydroxides a2 to f2. As a result, the presence of nickel oxyhydroxide was confirmed in all of the diffraction patterns. The nickel oxyhydroxide f2 was substantially a single phase of γ-nickel oxyhydroxide, and its peak pattern coincided with the JCPDS inorganic material file, File No. 6-75. On the other hand, each of the nickel oxyhydroxides b2 to e2 were a eutectic material of a γ-type crystal and a β-type crystal. FIG. 2 shows the diffraction patterns of the nickel oxyhydroxides e2 and f2 as typical examples.

Table 10 shows the values of $I_\gamma/(I_\gamma+I_\beta)$, the contents of nickel, the average valences of nickel, the tap densities, the contents of water, the average particle diameters, the BET specific surface areas that were obtained for the nickel oxyhydroxides a2 to f2.

In the cases of the nickel oxyhydroxides a2 and b2, which were obtained by chemical oxidation, the value of $I_\gamma/(I_\gamma+I_\beta)$ was small and the average valence of nickel was substantially near 3; however, in the cases of the nickel oxyhydroxides c2 to f2, which were obtained by subjecting the above-mentioned nickel oxyhydroxides to an overcharge treatment, it was observed that the value of $I_\gamma/(I_\gamma+I_\beta)$ and the average valence of nickel effectively increased in accordance with the amount of the charged current capacity. Furthermore, since the expansion and the cracking of the nickel hydroxide particles proceeded with the formation of γ-NiOOH, there was a tendency for the content of nickel and the tap density to decrease, and for the content of water and the BET specific surface area to increase.

[4] Fabrication of Alkaline Batteries

Nickel-manganese batteries A2 to F2 as shown in FIG. 1 were fabricated in a manner similar to that in Example 1, using the nickel oxyhydroxides a2 to f2, respectively. It should be noted that although the batteries using the nickel oxyhydroxides c2 to f2 showed a minor decrease in the filled amount of the positive electrode material mixture in the batteries, it was possible to fabricate the batteries basically the same as those using the nickel oxyhydroxides a2 and b2. The decrease in the filled amount was attributed to the volume expansion of the powder due to the formation of γ-NiOOH.

[5] Evaluation of Alkaline Batteries

Each of the batteries A2 to F2 was continuously discharged at 20° C. with a constant current of 50 mA, and the discharge capacity obtained during a period in which the battery voltage reached an end voltage of 0.9 V was measured. The results obtained were summarized in Table 11. It should be noted that, in Table 11, the values of the discharge capacity were shown as relative values, taking the discharge capacity of the nickel-manganese battery A2 as 100.

TABLE 11

| Type of battery | Type of nickel oxyhydroxide | Battery capacity (standardized value) |
|---|---|---|
| Battery A2 | Nickel oxyhydroxide a2 | 100 |
| Battery B2 | Nickel oxyhydroxide b2 | 99 |
| Battery C2 | Nickel oxyhydroxide c2 | 103 |
| Battery D2 | Nickel oxyhydroxide d2 | 109 |
| Battery E2 | Nickel oxyhydroxide e2 | 111 |
| Battery F2 | Nickel oxyhydroxide f2 | 114 |

The batteries C2 to F2, which used nickel oxyhydroxide whose γ-NiOOH content had been increased by an overcharge treatment, provided a higher capacity than the batter-

TABLE 10

| Type of nickel oxyhydroxide | Powder X-ray diffraction $I_\gamma/(I_\gamma+I_\beta)$ | Nickel content [wt %] | Average valence of nickel | Tap density [g/cm$^3$] | Water content [wt %] | Average particle diameter [im] | BET specific surface area [m$^2$/g] |
|---|---|---|---|---|---|---|---|
| Nickel oxyhydroxide a2 | 0.01 | 62.2 | 3.03 | 2.30 | 0.55 | 10.1 | 11.0 |
| Nickel oxyhydroxide b2 | 0.07 | 61.5 | 3.07 | 2.27 | 0.95 | 11.3 | 12.4 |
| Nickel oxyhydroxide c2 | 0.24 | 58.8 | 3.22 | 2.10 | 1.20 | 12.2 | 13.9 |
| Nickel oxyhydroxide d2 | 0.52 | 56.2 | 3.36 | 1.96 | 1.50 | 11.7 | 16.2 |
| Nickel oxyhydroxide e2 | 0.79 | 54.8 | 3.51 | 1.85 | 1.85 | 11.2 | 17.8 |
| Nickel oxyhydroxide f2 | 1.00 | 53.6 | 3.62 | 1.76 | 2.05 | 9.4 | 19.0 | ies A2 and B2, which used nickel oxyhydroxide that had been obtained by chemical oxidation. In particular, the batteries using the nickel oxyhydroxides d2 to f2, in which the value of $I_\gamma/(I_\gamma+I_\beta)$ in a powder X-ray diffraction was increased to not less than 0.5, and the average valence of nickel to not less than 3.3, achieved an even more significant effect of increasing the capacity.

The γ-NiOOH that was produced at a stage where the average valence of nickel was a relatively small, such as the nickel oxyhydroxide b2 and c2, seems to have made little contribution to the discharge capacity. On the other hand, the γ-NiOOH that was produced at a stage where the average valence of nickel was not less than about 3.3, such as the nickel oxyhydroxides d2 to f2, seems to have provided a large capacity corresponding to that valence. The fact that the nickel oxyhydroxides d2 to f2 had a relatively large specific surface area and a large effective area for electrochemical reaction seems to be a cause of the capacity increase. However, in the case of producing nickel oxyhydroxide composed mainly of a γ-type crystal by electrochemically overoxidizing (performing overcharge treatment on) β-NiOOH that has been obtained by chemical oxidation, the productivity of the battery becomes relatively low.

Example 6

In order to facilitate the formation of a γ-type crystal, various nickel hydroxides in which Mn as an additive element was dissolved were produced as a source material nickel hydroxide, and an attempt was made to produce nickel oxyhydroxide composed mainly of a γ-type crystal only by chemical oxidation. It should be noted that, in all of Synthesis 1 to Synthesis 5 below, the composition of the source material nickel hydroxide was adjusted to $Ni_{0.9}Mn_{0.1}(OH)_2$.

[1] Synthesis 1

(1) Production of Nickel Hydroxide

Pure water and a small amount of hydrazine (reducing agent) were added into a reaction vessel provided with a stirring blade, and bubbling with a nitrogen gas was started. A nickel (II) sulfate aqueous solution, a manganese (II) sulfate aqueous solution, a sodium hydroxide aqueous solution and ammonia water having predetermined concentrations were supplied with pumps into the reaction vessel such that the pH in the vessel was constant, and continuous stirring was performed sufficiently, thereby precipitating and growing a solid solution β-nickel hydroxide in which Mn was dissolved.

Subsequently, the resulting particles were heated in a sodium hydroxide aqueous solution that was different from the one described above to remove sulfate ions, followed by washing with water and vacuum drying. The dried particles were further subjected to air oxidation at 80° C. for 72 hours to oxidize only manganese, thereby producing a source material nickel hydroxide 1.

The source material nickel hydroxide 1 was a single phase of β-nickel hydroxide in a powder X-ray diffraction, and had an average valence of manganese of 3.95, an average particle diameter of 14 μm, a tap density of 2.12 g/cm³ and a BET specific surface area of 9.5 m²/g.

(2) Oxidation of Nickel Hydroxide to Nickel Oxyhydroxide

Subsequently, after 200 g of the source material nickel hydroxide 1 was introduced into 1 L of a 0.5 mol/L sodium hydroxide aqueous solution, a sufficient amount of a sodium hypochlorite aqueous solution (effective chlorine concentration: 5 wt %) serving as an oxidizing agent was added thereto, and the whole was stirred to convert the nickel hydroxide into nickel oxyhydroxide. The resulting particles were sufficiently washed with water, followed by vacuum drying at 60° C. (24 hours), thereby producing a nickel oxyhydroxide g2.

Further, nickel oxyhydroxides h2 to 12 were produced in the same manner as described above, except for changing the concentration of the sodium hydroxide aqueous solution from 0.5 mol/L to 1 mol/L, 2 mol/L, 3 mol/L, 5 mol/L or 7 mol/L.

[2] Synthesis 2

(1) Production of Nickel Hydroxide

A source material nickel hydroxide 2 was obtained in the same manner as in Synthesis 1 above, except that the air oxidation at 80 for 72 hours was not performed. The source material nickel hydroxide 2 was a single phase of β-nickel hydroxide in a powder X-ray diffraction, and its average valence of manganese was estimated to be 2.04.

(2) Oxidation of Nickel Hydroxide to Nickel Oxyhydroxide

Then, after 200 g of the source material nickel hydroxide 2 was introduced into 1 L of a 7 mol/L sodium hydroxide aqueous solution, a sufficient amount of a sodium hypochlorite aqueous solution (effective chlorine concentration: 5 wt %) serving as an oxidizing agent was added thereto, and the whole was stirred to convert the nickel hydroxide into nickel oxyhydroxide. The resulting particles were sufficiently washed with water, followed by vacuum drying at 60° C. (24 hours), thereby producing a nickel oxyhydroxide m2.

[3] Synthesis 3

(1) Production of Nickel Hydroxide

A source material nickel hydroxide 3 was obtained in the same manner as in Synthesis 1 above, except that the particles were stood still in the air at 20 for one month, instead of being subjected to the air oxidation at 80 for 72 hours. In a powder X-ray diffraction of the source material nickel hydroxide 3, some peaks of manganese oxyhydroxide and manganese dioxide were observed, in addition to those of the β-type nickel hydroxide, so that it was inferred that unstable manganese species were liberated outside the crystal of the nickel hydroxide, because of being stood still for a long period of time. The average valence of manganese in the source material nickel hydroxide 3 was 3.47.

(2) Oxidation of Nickel Hydroxide to Nickel Oxyhydroxide

Then, after 200 g of the source material nickel hydroxide 3 was introduced into 1 L of a 7 mol/L sodium hydroxide aqueous solution, a sufficient amount of a sodium hypochlorite aqueous solution (effective chlorine concentration: 5 wt %) serving as an oxidizing agent was added thereto, and the whole was stirred to convert the nickel hydroxide into nickel oxyhydroxide. At this time, red coloration of the reaction liquid due to the oxidation or dissolution of the liberated manganese species was clearly observed. The resulting particles were sufficiently washed with water, followed by vacuum drying at 60° C. (24 hours), thereby producing a nickel oxyhydroxide n2.

[4] Synthesis 4

(1) Production of Nickel Hydroxide

A source material nickel hydroxide 4 was obtained in the same manner as in Synthesis 1 described above, except that a nickel (II) sulfate aqueous solution, a manganese (II) sulfate aqueous solution, a sodium hydroxide aqueous solution and ammonia water having predetermined concentrations were supplied with pumps into a reaction vessel provided with a stirring blade such that the pH in the reaction vessel was constant, without performing the bubbling with a nitrogen gas and the addition of hydrazine into the reaction vessel. The source material nickel hydroxide 4 was a single phase of β-type nickel hydroxide in a powder X-ray diffraction, and had an average valence of manganese of 2.45, an average particle diameter of 14 μm, a tap density of 2.04 g/cm³ and a BET specific surface area of 10.9 m²/g.

(2) Oxidation of Nickel Hydroxide to Nickel Oxyhydroxide

Then, after 200 g of the source material nickel hydroxide 4 was introduced into 1 L of a 7 mol/L sodium hydroxide aqueous solution, a sufficient amount of a sodium hypochlorite aqueous solution (effective chlorine concentration: 5 wt %) serving as an oxidizing agent was added thereto, and the whole was stirred to convert the nickel hydroxide into nickel oxyhydroxide. Also at this time, red coloration of the reaction liquid due to the oxidation or dissolution of the manganese species was clearly observed. From this, it was inferred that, in the source material nickel hydroxide 4, a majority of the manganese ions were inserted in an unstable state in the crystal of the nickel hydroxide. The resulting particles were sufficiently washed with water, followed by vacuum drying at 60 (24 hours), thereby producing a nickel oxyhydroxide o2.

[5] Synthesis 5

(1) Production of Nickel Hydroxide

After a hydrogen peroxide solution was added to a manganese (II) sulfate aqueous solution, a sodium hydroxide aqueous solution was added thereto to adjust the pH, thus preparing a solution in which manganese ions were present in a trivalent state. This solution, a nickel (II) sulfate aqueous solution, a sodium hydroxide aqueous solution and ammonia water were supplied with pumps into a reaction vessel provided with a stirring blade such that the pH in the vessel was constant, and continuous stirring was performed sufficiently, thus precipitating and growing nickel hydroxide including a α-type crystal structure and containing 10 mol % of trivalent Mn. The resulting particles were sufficiently washed with water, followed by vacuum drying, thereby producing a source material nickel hydroxide 5. The source material nickel hydroxide 5 was a single phase of α-nickel hydroxide in a powder X-ray diffraction, and had an average valence of manganese of 3.02, an average particle diameter of 13 μm, a tap density of 1.28 g/cm³ and a BET specific surface area of 24.5 m²/g.

(2) Oxidation of Nickel Hydroxide to Nickel Oxyhydroxide

Then, after 200 g of the source material nickel hydroxide 5 was introduced into 1 L of a 7 mol/L sodium hydroxide aqueous solution, a sufficient amount of a sodium hypochlorite aqueous solution (effective chlorine concentration: 5 wt %) serving as an oxidizing agent was added thereto, and the whole was stirred to convert the nickel hydroxide into nickel oxyhydroxide. Also at this time, red coloration of the reaction liquid due to the oxidation or dissolution of the manganese species was observed. From this, it was inferred that, in the source material nickel hydroxide 5, a majority of the manganese ions were inserted in an unstable state in the crystal of the nickel hydroxide. The resulting particles were sufficiently washed with water, followed by vacuum drying at 60° C. (24 hours), thereby producing a nickel oxyhydroxide p2.

[6] Analysis of Physical Properties of Nickel Oxyhydroxides

Table 10 shows the values of $I_\gamma/(I_\gamma+I_\beta)$, the contents of nickel, the average valences of nickel, the tap densities, the contents of water, the average particle diameters, the BET specific surface areas that were obtained for the nickel oxyhydroxides g2 to p2.

TABLE 12

| Type of nickel oxyhydroxide | Powder X-ray diffraction $I_\gamma/(I_\gamma + I_\beta)$ | Nickel content [wt %] | Average nickel valence | Tap density [g/cm³] | Water content [wt %] | Average particle diameter [μm] | BET specific surface area [m²/g] |
|---|---|---|---|---|---|---|---|
| Nickel oxyhydroxide g2 | 0.06 | 54.2 | 3.08 | 2.15 | 0.45 | 14.3 | 10.2 |
| Nickel oxyhydroxide h2 | 0.24 | 54.0 | 3.15 | 2.13 | 0.84 | 15.0 | 11.0 |
| Nickel oxyhydroxide i2 | 0.46 | 52.8 | 3.27 | 2.02 | 1.12 | 15.2 | 12.4 |
| Nickel oxyhydroxide j2 | 0.72 | 52.1 | 3.39 | 1.91 | 1.55 | 14.6 | 15.3 |
| Nickel oxyhydroxide k2 | 0.88 | 51.5 | 3.48 | 1.84 | 1.78 | 14.0 | 16.2 |
| Nickel oxyhydroxide l2 | 0.97 | 51.0 | 3.55 | 1.73 | 1.85 | 12.9 | 18.5 |
| Nickel oxyhydroxide m2 | 0.89 | 51.4 | 3.48 | 1.65 | 1.82 | 13.0 | 20.3 |
| Nickel oxyhydroxide n2 | 0.86 | 51.4 | 3.45 | 1.59 | 1.84 | 13.3 | 22.5 |
| Nickel oxyhydroxide o2 | 0.91 | 51.2 | 3.49 | 1.48 | 3.51 | 12.5 | 31.5 |
| Nickel oxyhydroxide p2 | 0.95 | 48.9 | 3.54 | 1.25 | 3.65 | 13.1 | 33.8 |

It can be seen that, with an increase (from g2 to l2) in the concentration of the sodium hydroxide aqueous solution that was present during the chemical oxidation of the source material nickel hydroxide 1, the value of $I_\gamma/(I_\gamma+I_\beta)$ increased and the oxidation of nickel thus proceeded. The reason for this can be understood as follows: Increasing the concentration of the sodium hydroxide aqueous solution allowed the alkali metal ions to be effectively inserted between the $NiO_2$ layers of the nickel oxyhydroxide to maintain the electrical neutrality of the quadrivalent nickel ions, thus accelerating the reaction for forming higher order nickel.

Further, it was confirmed that the nickel oxyhydroxides m2 to p2, which were obtained by a chemical oxidation treatment of the source material nickel hydroxides 2 to 5, provided a powder X-ray diffraction pattern similar in appearance to that of the nickel oxyhydroxide l2, which was obtained from the source material nickel hydroxide 1, and also had a similar average valence of nickel.

[7] Fabrication of Alkaline Batteries

Nickel-manganese batteries as shown in FIG. 1 were fabricated in the same manner as in Example 5, except for using the nickel oxyhydroxides g2 to p2, respectively, in place of the nickel oxyhydroxide a2 to f2. The batteries using the nickel oxyhydroxides g2 to p2 were named batteries G2 to P2, respectively.

[8] Evaluation of Alkaline Batteries

Each of the batteries A2 to F2 was continuously discharged at 20° C. with a constant current of 50 mA, and the discharge capacity obtained during a period in which the battery voltage reached an end voltage of 0.9 V was measured. The results obtained were summarized in Table 13. It should be noted that, in Table 13, the values of the discharge capacity were shown as relative values, taking the discharge capacity of the battery A2 of Example 5 as 100.

TABLE 13

| Type of battery | Type of nickel oxyhydroxide | Battery capacity (standardized value) |
|---|---|---|
| Battery G2 | Nickel oxyhydroxide g2 | 101 |
| Battery H2 | Nickel oxyhydroxide h2 | 102 |
| Battery I2 | Nickel oxyhydroxide i2 | 102 |
| Battery J2 | Nickel oxyhydroxide j2 | 110 |
| Battery K2 | Nickel oxyhydroxide k2 | 113 |
| Battery L2 | Nickel oxyhydroxide l2 | 116 |
| Battery M2 | Nickel oxyhydroxide m2 | 106 |
| Battery N2 | Nickel oxyhydroxide n2 | 106 |
| Battery O2 | Nickel oxyhydroxide o2 | 96 |
| Battery P2 | Nickel oxyhydroxide p2 | 92 |

The source material nickel hydroxide 1 was obtained by performing air oxidation on a solid solution β-nickel hydroxide in which Mn was dissolved, which was obtained by reaction crystallization, and oxidizing only Mn. On the other hand, the nickel oxyhydroxides j2 to l2 were obtained by chemically oxidizing the source material nickel hydroxide 1 with a sodium hypochlorite aqueous solution in a sodium hydroxide aqueous solution at 3 mol/l or more. The batteries J2 to L2, which used the nickel oxyhydroxides j2 to l2, provided a remarkably higher capacity than the batteries using the nickel oxyhydroxides obtained by other processes.

The reason that the capacities of the batteries J2 to L2 were remarkably higher than those of the batteries G2 to I2 can be explained similarly as in Example 5. That is, the γ-NiOOH that was formed at a stage where the average valence of nickel was relatively small, such as the nickel oxyhydroxides g2 to i2, seems to have not made much contribution to the discharge capacity. On the other hand, the γ-NiOOH that was formed at a stage where the average valence of nickel was about not less than 3.3, such as the nickel oxyhydroxides j2 to l2, seems to have had high activity, thus providing a large discharge capacity corresponding to that valence.

The batteries M2 and N2 also exhibited a higher discharge capacity higher than the batteries G2 to I2. The nickel oxyhydroxides of the batteries M2 and N2 had physical properties that were substantially equivalent to those of the nickel oxyhydroxide 1, which was obtained from the source material nickel hydroxide 1. Therefore, it seems that the batteries M2 and N2 had the most excellent discharge characteristics after those of the batteries J2 to K2.

The nickel hydroxide 2, which was the source material of the nickel oxyhydroxide m2 used for the battery M2, had not undergone the treatment for oxidizing Mn. Although the detailed mechanism is unknown, it is considered that when nickel hydroxide is treated with an oxidizing agent in a state in which Mn has not been oxidized into a higher oxidation state, localized liberation or the like of the manganese oxide occurs in the particles, for example, due to the movement of the manganese species in the crystal. However, such liberation of the manganese oxide is considered to be at a level that cannot be found by a commonly used powder X-ray diffraction method. Thus, it is inferred that, in the nickel oxyhydroxide m2, the amount of production of γ-nickel oxyhydroxide having high discharge efficiency that could contribute to an increase of the battery capacity was small. Likewise, it is inferred that battery N2 was also affected by the liberated manganese.

Although the nickel oxyhydroxides o2 and p2, which were used for the batteries O2 and P2, were similar to the nickel oxyhydroxide l2 (or k2) in the powder X-ray diffraction or the average valence of nickel, they exhibited a smaller capacity. Since the phenomenon of liberation of manganese species and the dissolution of manganese, for example, were confirmed during production of the nickel oxyhydroxides o2 and p2, it is inferred that the discharge reaction of the nickel oxyhydroxide was hindered by the manganese species. In particular, the nickel oxyhydroxide o2 and p2 had a water content exceeding 3 wt % and a BET specific surface area exceeding 30 $m^2$/g. Therefore, it seems that the electrolyte distribution in the positive electrode material mixture, for example, in the batteries O2 and P2 was significantly different from that in the rest of the batteries, and this affected the capacity.

Example 7

[1] Production of Nickel Oxyhydroxide

Nickel oxyhydroxides r1 to r6 were prepared in the same manner as with the nickel oxyhydroxide L2 of Example 6, except for varying the ratio between the nickel (II) sulfate aqueous solution and the manganese (II) sulfate aqueous solution, as well as the content of manganese in the source material nickel hydroxide.

Further, nickel oxyhydroxides s1 to s6 were prepared in the same manner as with the nickel oxyhydroxide L2 of Example 6, except for varying the ratio between the nickel (II) sulfate aqueous solution and the manganese (II) sulfate aqueous solution, as well as the content of manganese in the source material nickel hydroxide, and reducing the amount of the sodium hypochlorite aqueous solution added in the chemical oxidation.

[2] Analysis of Physical Properties of Nickel Oxyhydroxides

Table 14 shows the values of $I_\gamma/(I_\gamma+I_\beta)$, the contents of nickel, and the average valences of nickel that were obtained for the nickel oxyhydroxides r1 to r6 and s1 to s6.

TABLE 14

| Type of nickel oxyhydroxide | Powder X-ray diffraction $I_\gamma/(I_\gamma+I_\beta)$ | Nickel content [wt %] | Average valence of nickel | Battery capacity (standardized value) |
|---|---|---|---|---|
| Nickel oxyhydroxide r1 | 0.95 | 57.5 | 3.54 | 126 |
| Nickel oxyhydroxide r2 | 0.94 | 54.2 | 5.53 | 122 |
| Nickel oxyhydroxide r3 | 0.96 | 51.0 | 3.55 | 116 |
| Nickel oxyhydroxide r4 | 0.95 | 48.1 | 3.52 | 110 |
| Nickel oxyhydroxide r5 | 0.96 | 44.2 | 3.55 | 104 |
| Nickel oxyhydroxide r6 | 0.95 | 41.0 | 3.54 | 97 |
| Nickel oxyhydroxide s1 | 0.51 | 57.7 | 3.34 | 117 |
| Nickel oxyhydroxide s2 | 0.52 | 54.3 | 3.32 | 114 |
| Nickel oxyhydroxide s3 | 0.52 | 51.2 | 3.33 | 110 |
| Nickel oxyhydroxide s4 | 0.51 | 48.4 | 3.32 | 104 |
| Nickel oxyhydroxide s5 | 0.50 | 44.6 | 3.31 | 99 |
| Nickel oxyhydroxide s6 | 0.51 | 41.3 | 3.34 | 92 |
| Nickel oxyhydroxide a2 | 0.01 | 62.2 | 3.03 | 100 |

[3] Fabrication of Alkaline Batteries

Nickel-manganese batteries as shown in FIG. 1 were fabricated in the same manner as in Example 5, except for using the nickel oxyhydroxides r1 to r6 and s1 to s6, respectively, in place of the nickel oxyhydroxides a2 to f2. The batteries using the nickel oxyhydroxides r1 to r6 were named batteries R1 to R6, respectively. Further, the batteries using the nickel oxyhydroxides s1 to s6 were named batteries S1 to S6, respectively.

[4] Evaluation of Alkaline Batteries

Each of the batteries R1 to R6 and S1 to S6 was continuously discharged at 20° C. with a constant current of 50 mA, and the discharge capacity obtained during a period in which the battery voltage reached an end voltage of 0.9 V was measured. The results obtained were summarized in Table 14. It should be noted that, in Table 13, the values of the discharge capacity were shown as relative values, taking the discharge capacity of the battery A2 of Example 5 as 100.

From Table 14, it can be seen that the use of nickel oxyhydroxides having a nickel content of not less than 45 wt % could achieve a higher capacity than the battery using the nickel oxyhydroxide a2, even when the value of $I_\gamma/(I_\gamma+I_\beta)$ and the average valence of nickel were about 0.5 and about 3.3, respectively, which were not so large.

Although in the above-described examples the air oxidation was performed at 80° C. for 72 hours at the time of oxidizing manganese in the solid solution nickel hydroxide in which Mn was dissolved, similar results can also be obtained by increasing the valence of manganese to not less than 3.5, more preferably not less than 3.8, by appropriately adjusting the oxidation time at 50 to 150° C. under ambient atmosphere.

Although in the above-described examples the treatment was performed in a sodium hydroxide aqueous solution at the time of chemically oxidizing nickel with sodium hypochlorite, similar results can also be obtained by using a potassium hydroxide aqueous solution, a lithium hydroxide aqueous solution, or a mixed alkaline aqueous solution of these.

Although in the above-described examples 5 wt % of zinc oxide was added to the nickel oxyhydroxide in the positive electrode material mixture, this is not essential feature of the present invention.

Although in the above-described examples so-called inside-out type nickel-manganese batteries were fabricated, in which a positive electrode material mixture pellet in the form of a short cylinder, a separator and a gelled zinc negative electrode were disposed in a cylindrical positive electrode case. However, the present invention can also be adapted to alkaline batteries in other structures, including those of the button type and the square type.

INDUSTRIAL APPLICABILITY

While the present invention is applicable to various types of alkaline batteries, it is particularly useful for nickel-manganese batteries. Furthermore, since the present invention can realize a significant capacity increase for alkaline batteries without impairing the heavy load discharge characteristics, it is particularly useful for alkaline batteries serving as the power sources for devices requiring high load power.

The invention claimed is:

1. An alkaline battery comprising a positive electrode material mixture, a negative electrode, a separator interposed between said positive electrode material mixture and said negative electrode, and an alkaline electrolyte,
    wherein said positive electrode material mixture includes a first active material comprising nickel oxyhydroxide and a second active material comprising manganese dioxide, and the content of said manganese dioxide in said positive electrode material mixture is 20 to 90 wt %,
    said nickel oxyhydroxide is a solid solution in which both manganese and cobalt are dissolved as an additive element, the amount of each of manganese and cobalt dissolved in said solid solution is 1 to 7 mol % of the total of all of metallic elements included in said solid solution, and a content of nickel in said nickel oxyhydroxide is not less than 45 wt %,
    an average particle diameter on a volume basis of said nickel oxyhydroxide measured with a laser diffraction particle size distribution analyzer is 3 to 20 μm, and
    said nickel oxyhydroxide includes a γ-type crystal structure and a β-type crystal structure, and a powder X-ray diffraction pattern of said nickel oxyhydroxide includes a diffraction peak $P_\gamma$ attributed to the (003) plane of a γ-type crystal having an interplanar spacing of 6.8 to 7.1 angstroms (Å) and a diffraction peak $P_\beta$ attributed to the (001) plane of a β-type crystal having an interplanar spacing of 4.5 to 5 angstroms (Å), an integrated intensity $I_\gamma$ of said diffraction peak $P_\gamma$ and an integrated intensity $I_\beta$ of said diffraction peak $P_\beta$ satisfy $0.5 \leq I_\gamma/(I_\gamma+I_\beta)$ and average valence of nickel included in said nickel oxyhydroxide is not less than 3.3.

2. The alkaline battery in accordance with claim 1, wherein the tap density of said nickel oxyhydroxide after 500 times of tapping is not less than 1.5 g/cm$^3$, the content of water in said nickel oxyhydroxide is not more than 3 wt %, and the specific surface area of said nickel oxyhydroxide measured by a BET method is 10 to 30 m$^2$/g.

3. The alkaline battery in accordance with claim 1, wherein said solid solution carries a cobalt oxide attached onto a surface thereof.

4. The alkaline battery in accordance with claim 3, wherein the amount of said cobalt oxide is 0.1 to 7 wt % of said solid solution.

5. The alkaline battery in accordance with claim 3, wherein the average valence of cobalt included in said cobalt oxide is greater than 3.0.

* * * * *